United States Patent
Lyu et al.

(10) Patent No.: US 12,495,341 B1
(45) Date of Patent: Dec. 9, 2025

(54) CELL HANDOVER METHOD, TERMINAL DEVICE, AND NETWORK DEVICE

(71) Applicant: QUECTEL WIRELESS SOLUTIONS CO., LTD., Shanghai (CN)

(72) Inventors: Ling Lyu, Shanghai (CN); Zheng Zhao, Shanghai (CN); Zhongzhi Yang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 19/003,781

(22) Filed: Dec. 27, 2024

Related U.S. Application Data

(63) Continuation of application No. PCT/CN2023/091729, filed on Apr. 28, 2023.

(51) Int. Cl.
| | | |
|---|---|---|
| *H04W 36/08* | (2009.01) | |
| *H04W 36/36* | (2009.01) | |
| *H04W 56/00* | (2009.01) | |

(52) U.S. Cl.
CPC ......... *H04W 36/08* (2013.01); *H04W 36/362* (2023.05); *H04W 56/001* (2013.01)

(58) Field of Classification Search
CPC .. H04W 36/08; H04W 36/362; H04W 56/001
See application file for complete search history.

(56) References Cited

U.S. PATENT DOCUMENTS

| | | | |
|---|---|---|---|
| 2020/0314914 A1 | 10/2020 | Roy et al. | |
| 2022/0240151 A1* | 7/2022 | Yu | H04B 7/18541 |
| 2023/0199680 A1* | 6/2023 | Leng | G01S 19/25 |
| | | | 370/503 |
| 2023/0308924 A1* | 9/2023 | Fan | H04W 24/10 |

FOREIGN PATENT DOCUMENTS

| | | |
|---|---|---|
| CN | 112787702 A | 5/2021 |
| CN | 113347621 A | 9/2021 |
| CN | 114765812 A | 7/2022 |
| CN | 115604665 A | 1/2023 |

OTHER PUBLICATIONS

International Search Report and Written Opinion in International Appln. No. PCT/CN2023/091729, mailed on Dec. 11, 2023, 9 pages (with partial English translation).

* cited by examiner

*Primary Examiner* — Kyaw Z Soe
(74) *Attorney, Agent, or Firm* — Fish & Richardson P.C.

(57) ABSTRACT

The present application provides a cell handover method, a terminal device, and a network device. One example method includes: receiving, by a terminal device in a non-terrestrial (NTN) network, first information, wherein the first information comprises second auxiliary information of at least one of a target cell corresponding to a source cell or a neighboring cell corresponding to the source cell, wherein a physical cell identity (PCI) of a target cell is the same as a PCI of the source cell; performing downlink synchronization with the target cell; and accessing the target cell.

20 Claims, 5 Drawing Sheets

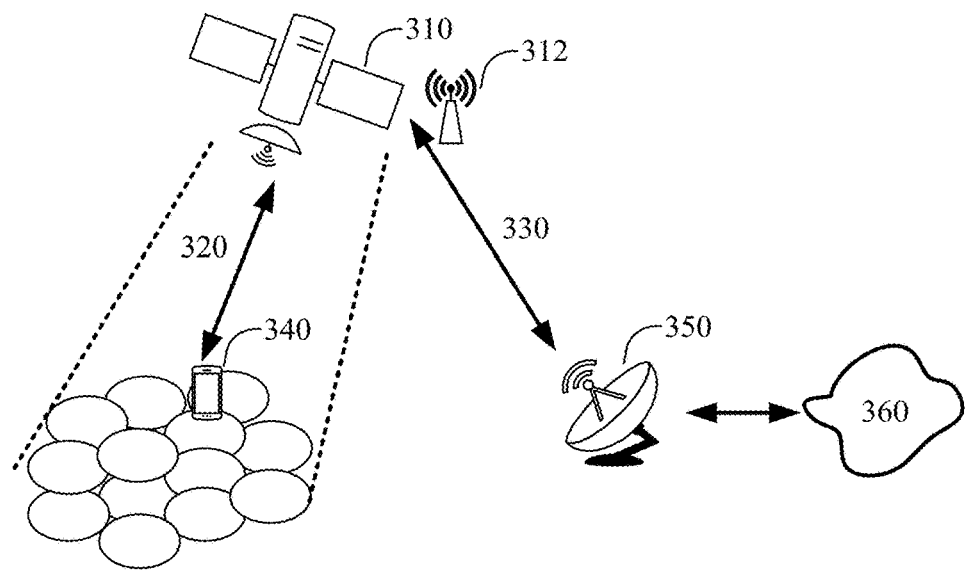
FIG. 3
FIG. 4
A terminal device receives handover indication information transmitted by a source network device to a first set of terminal devices — S510
FIG. 5
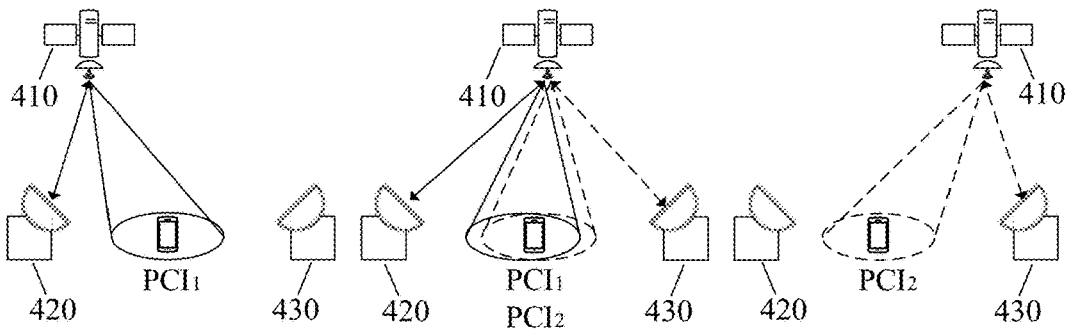
FIG. 6

CELL HANDOVER METHOD, TERMINAL DEVICE, AND NETWORK DEVICE

CROSS-REFERENCE TO RELATED APPLICATIONS

This application is a continuation of International Application No. PCT/CN2023/091729, filed on Apr. 28, 2023, the disclosure of which is hereby incorporated by reference in its entirety.

TECHNICAL FIELD

The present application relates to the field of communications technologies, and more specifically, to a cell handover method, a terminal device, and a network device.

BACKGROUND

In some communications systems (for example, a non-terrestrial network (NTN) system), a coverage area of a cell is large, and thus a quantity of users in the cell is large. In a cell handover process, a large quantity of terminal devices simultaneously perform handover from a source cell to a target cell, causing a sharp increase of control signalling. As a result, congestion occurs in the target cell, and a handover failure rate is high.

SUMMARY

The present application provides a cell handover method, a terminal device, and a network device. Various aspects of embodiments of the present application are described below.

According to a first aspect, a cell handover method is provided, including: receiving, by a terminal device, first information transmitted by a source network device to a first set of terminal devices, where the first information is used to assist at least some of terminal devices in the first set of terminal devices in cell handover from a source cell corresponding to the source network device to a target cell corresponding to a target network device; the first set of terminal devices is one of a plurality of sets of terminal devices in the source cell; and the plurality of sets of terminal devices are determined based on grouping information.

According to a second aspect, a cell handover method is provided, including: transmitting, by a source network device, first information to a terminal device in a first set of terminal devices, where the first information is used to assist at least some of terminal devices in the first set of terminal devices in cell handover from a source cell corresponding to the source network device to a target cell corresponding to a target network device; the first set of terminal devices is one of a plurality of sets of terminal devices in the source cell; and the plurality of sets of terminal devices are determined based on grouping information.

According to a third aspect, a terminal device is provided, including: a receiving unit, receiving first information transmitted by a source network device to a first set of terminal devices, where the first information is used to assist at least some of terminal devices in the first set of terminal devices in cell handover from a source cell corresponding to the source network device to a target cell corresponding to a target network device; the first set of terminal devices is one of a plurality of sets of terminal devices in the source cell; and the plurality of sets of terminal devices are determined based on grouping information.

According to a fourth aspect, a network device is provided. The network device is a source network device. The source network device includes: a transmitting unit, transmitting first information to a terminal device in a first set of terminal devices, where the first information is used to assist at least some of terminal devices in the first set of terminal devices in cell handover from a source cell corresponding to the source network device to a target cell corresponding to a target network device; the first set of terminal devices is one of a plurality of sets of terminal devices in the source cell; and the plurality of sets of terminal devices are determined based on grouping information.

According to a fifth aspect, a communications apparatus is provided, including a memory and a processor, where the memory is configured to store a program; and the processor is configured to invoke the program in the memory to execute the method according to the first aspect or the second aspect.

According to a sixth aspect, an apparatus is provided, including a processor configured to invoke a program from a memory to execute the method according to the first aspect or the second aspect.

According to a seventh aspect, a chip is provided, including a processor configured to invoke a program from a memory to cause a device installed with the chip to execute the method according to the first aspect or the second aspect.

According to an eighth aspect, a computer-readable storage medium is provided, storing a program thereon, where the program causes a computer to execute the method according to the first aspect or the second aspect.

According to a ninth aspect, a computer program product is provided, including a program, where the program causes a computer to execute the method according to the first aspect or the second aspect.

According to a tenth aspect, a computer program is provided. The computer program causes a computer to execute the method according to the first aspect or the second aspect.

In embodiments of the present application, some or all terminal devices in a source cell are grouped into a plurality of sets of terminal devices. A source network device transmits, based on a set of terminal devices, first information used for assisting the terminal device in cell handover.

BRIEF DESCRIPTION OF THE DRAWINGS

FIG. 3 shows another NTN system to which an embodiment of the present application is applied.

FIG. 4 is a schematic diagram of soft feeder link handover in a NTN system.

FIG. 5 is a schematic flowchart of a cell handover method according to an embodiment of the present application.

FIG. 6 is a schematic flowchart of a cell handover method according to another embodiment of the present application.

DETAILED DESCRIPTION OF THE EMBODIMENTS

Figure 1:
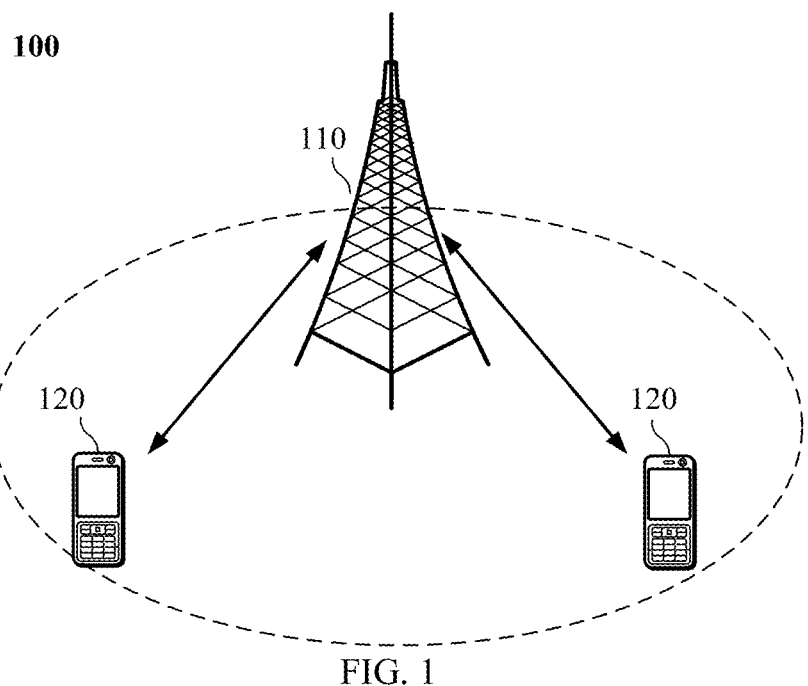
FIG. 1 shows a wireless communications system to which an embodiment of the present application is applied.

The following describes the technical solutions in embodiments of the present application with reference to the accompanying drawings in the embodiments of the present application. Apparently, the described embodiments are some rather than all of the embodiments of the present application. For the embodiments of the present application, all other embodiments obtained by a person of ordinary skill in the art without creative efforts fall within the protection scope of the present application.

Embodiments of the present application may be applied to various communications systems. For example, embodiments of the present application may be applied to a Global System for Mobile Communications (GSM), a code-division multiple access (CDMA) system, a wideband code-division multiple access (WCDMA) system, a general packet radio service (GPRS), a long term evolution (LTE) system, an advanced long term evolution (LTE-A) system, a new radio (NR) system, an evolved system of an NR system, an LTE-based access to unlicensed spectrum (LTE-U) system, an NR-based access to unlicensed spectrum (NR-U) system, a NTN system, a universal mobile telecommunications system (UMTS), a wireless local area network (WLAN), wireless fidelity (WiFi), and a fifth-generation (5G) communications system. Embodiments of the present application may be further applied to another communications system, such as a future communications system. The future communications system may be, for example, a sixth-generation (6G) mobile communications system, or a satellite communications system.

A quantity of connections supported by a conventional communications system is limited and is also easy to implement. However, with the development of communications technologies, a communications system may support not only conventional cellular communication but also one or more of other types of communication. For example, the communications system may support one or more types of the following communication: device-to-device (D2D) communication, machine-to-machine (M2M) communication, machine type communication (MTC), enhanced MTC (eMTC), vehicle-to-vehicle (V2V) communication, vehicle-to-everything (V2X) communication, and the like. Embodiments of the present application may also be applied to a communications system that supports the foregoing communication manners.

The communications system in embodiments of the present application may be applied to a carrier aggregation (CA) scenario, a dual connectivity (DC) scenario, or a standalone (SA) networking scenario.

The communications system in embodiments of the present application may be applied to an unlicensed spectrum. The unlicensed spectrum may also be considered as a shared spectrum. Alternatively, the communications system in embodiments of the present application may be applied to a licensed spectrum. The licensed spectrum may also be considered as a dedicated spectrum.

Embodiments of the present application may be applied to a terrestrial network (TN) system, or may be applied to a NTN system. For example, the NTN system may include a 4G-based NTN system, an NR-based NTN system, an internet of things (IoT)-based NTN system, and a narrow band-internet of things (NB-IoT)-based NTN system.

The communications system may include one or more terminal devices. The terminal device mentioned in embodiments of the present application may also be referred to as a user equipment (UE), an access terminal, a subscriber unit, a subscriber station, a mobile site, a mobile station (MS), a mobile terminal (MT), a remote station, a remote terminal, a mobile device, a user terminal, a terminal, a wireless communications device, a user agent, a user apparatus, or the like.

In some embodiments, the terminal device may be a station (ST) in a WLAN. In some embodiments, the terminal device may be a cellular phone, a cordless phone, a session initiation protocol (SIP) phone, a wireless local loop (WLL) station, a personal digital assistant (PDA) device, a handheld device having a wireless communication function, a computing device or another processing device connected to a wireless modem, a vehicle-mounted device, a wearable device, a terminal device in a next-generation communications system (such as an NR system) or a terminal device in a future evolved public land mobile network (PLMN), or the like.

In some embodiments, the terminal device may be a device providing a user with voice and/or data connectivity. For example, the terminal device may be a handheld device, a vehicle-mounted device, or the like having a wireless connection function. In some specific examples, the terminal device may be a mobile phone, a tablet computer (Pad), a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in smart grid, a wireless terminal in transportation safety, a wireless terminal in smart city, a wireless terminal in smart home, or the like.

In some embodiments, the terminal device may be deployed on land. For example, the terminal device may be deployed indoors or outdoors. In some embodiments, the terminal device may be deployed on water, for example, on a ship. In some embodiments, the terminal device may be deployed in the air, for example, on an airplane, a balloon, or a satellite.

In addition to the terminal device, the communications system may further include one or more network devices. The network device in embodiments of the present application may be a device for communicating with the terminal device. The network device may also be referred to as an access network device or a wireless access network device. The network device may be, for example, a base station. The network device in embodiments of the present application may be a radio access network (RAN) node (or device) that connects the terminal device to a wireless network. The base station may broadly cover various names in the following, or may be interchangeable with the following names, for example: a NodeB, an evolved NodeB (eNB), a next generation NodeB (gNB), a relay station, an access point, a transmitting and receiving point (TRP), a transmitting point (TP), a master MeNB, a secondary SeNB, a multi-standard radio (MSR) node, a home base station, a network controller, an access node, a wireless node, an access point (AP), a transmission node, a transceiver node, a base band unit (BBU), a remote radio unit (RRU), an active antenna unit (AAU), a remote radio head (RRH), a central unit (CU), a distributed unit (DU), and a positioning node. The base station may be a macro base station, a micro base station, a relay node, a donor node, or the like, or a combination thereof. Alternatively, the base station may be a communications module, a modem, or a chip disposed in the device or apparatus described above. Alternatively, the base station may be a mobile switching center, a device that functions as a base station in D2D, V2X, and M2M communications, a network-side device in a 6G network, a device that functions as a base station in a future communications system, or the like. The base station may support networks with a same access technology or different access technologies. A specific technology and a specific device form used by the network device are not limited in embodiments of the present application.

The base station may be a fixed or mobile base station. For example, a helicopter or an unmanned aerial vehicle may be configured to act as a mobile base station, and one or more cells may move depending on a location of the mobile base station. In another example, a helicopter or an unmanned aerial vehicle may be configured to serve as a device in communication with another base station.

In some deployments, the network device in embodiments of the present application may be a CU or a DU, or the network device includes a CU and a DU. The gNB may further include an AAU.

By way of example rather than limitation, in embodiments of the present application, the network device may have a mobility characteristic. For example, the network device may be a mobile device. In some embodiments of the present application, the network device may be a satellite or a balloon station. In some embodiments of the present application, the network device may alternatively be a base station disposed in a location such as land or water.

In embodiments of the present application, the network device may provide a service for a cell, and the terminal device communicates with the network device by using a transmission resource (for example, a frequency domain resource or a spectrum resource) used by the cell. The cell may be a cell corresponding to the network device (for example, a base station). The cell may belong to a macro base station or belong to a base station corresponding to a small cell (small cell). The small cell herein may include: a metro cell, a micro cell, a pico cell, a femto cell, or the like. These small cells feature small coverage and low transmit power, and are suitable for providing a high-speed data transmission service.

For example, FIG. 1 is a schematic diagram of an architecture of a communications system according to an embodiment of the present application. As shown in FIG. 1, the communications system 100 may include a network device 110, and the network device 110 may be a device that communicates with a terminal device 120 (or referred to as a communications terminal or a terminal). The network device 110 may provide communication coverage for a specific geographic area, and may communicate with a terminal device within the coverage area.

FIG. 1 exemplarily shows one network device and two terminal devices. In some embodiments of the present application, the communications system 100 may include a plurality of network devices, and another quantity of terminal devices may be included within a coverage area of each network device, which is not limited in embodiments of the present application.

Figure 2:
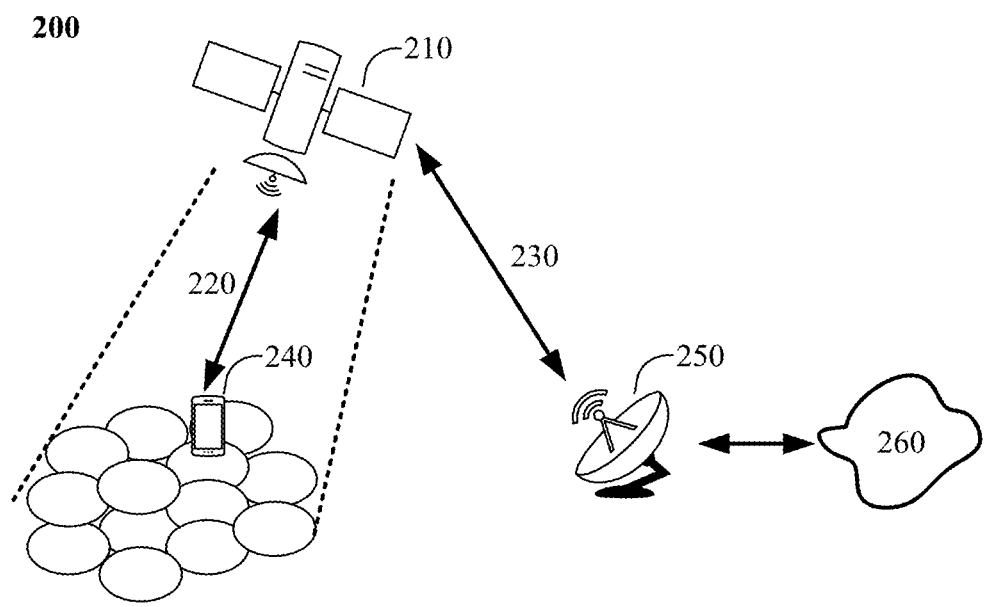
FIG. 2 shows a NTN system to which an embodiment of the present application is applied.

For example, FIG. 2 is a schematic diagram of an architecture of the foregoing NTN system. The NTN system 200 shown in FIG. 2 uses a satellite 210 as an air platform. As shown in FIG. 2, a satellite radio access network includes the satellite 210, a service link 220, a feeder link 230, a terminal device 240, a gateway (GW) 250, and a network 260 including a base station and a core network.

The satellite 210 is a spacecraft based on a space platform. The service link 220 is a link between the satellite 210 and the terminal device 240. The feeder link 230 is a link between the gateway 250 and the satellite 210. The earth-based gateway 250 connects the satellite 210 to a base station or a core network, depending on selection of an architecture.

The NTN architecture shown in FIG. 2 is a bent pipe transponder architecture. In this architecture, the base station is located on the earth behind the gateway 250, and the satellite 210 functions as a relay. The satellite 210 operates as a repeater for forwarding a signal of the feeder link 230 to the service link 220, or forwarding a signal of the service link 220 to the feeder link 230. In other words, the satellite 210 does not have a function of a base station, and communication between the terminal device 240 and the base station in the network 260 needs to be forwarded by using the satellite 210.

For example, FIG. 3 is a schematic diagram of another architecture of the NTN system. As shown in FIG. 3, a satellite radio access network 300 includes a satellite 310, a service link 320, a feeder link 330, a terminal device 340, a gateway 350, and a network 360. Different from FIG. 2, a base station 312 is provided on the satellite 310, and the network 360 behind the gateway 350 includes only a core network.

The NTN architecture shown in FIG. 3 is a regenerative transponder architecture. In this architecture, the satellite 310 carries the base station 312, and may be directly connected to an earth-based core network through a link. The satellite 310 has a function of a base station, and the terminal device 340 may directly communicate with the satellite 310. Thus, the satellite 310 may be referred to as a network device.

The communications system in the architecture shown in FIG. 2 or FIG. 3 may include a plurality of network devices, and another quantity of terminal devices may be included within coverage of each network device, which is not limited in embodiments of the present application.

In embodiments of the present application, the communications system shown in FIG. 1 to FIG. 3 may further include another network entity such as a mobility management entity (MME) or an access and mobility management function (AMF), which is not limited in embodiments of the present application.

It should be understood that a device having a communication function in a network/system in embodiments of the present application may be referred to as a communications device. With the communications system 100 shown in FIG. 1 as an example, the communications device may include a network device 110 and a terminal device 120 that have a communications function. The network device 110 and the terminal device 120 may be specific devices described above. Details are not described herein again. The communications device may further include another device in the communications system 100, for example, another network entity such as a network controller or a mobility management entity, which is not limited in embodiments of the present application.

For ease of understanding, some related technical knowledge related to embodiments of the present application is introduced first. The following related technologies, as optional solutions, may be randomly combined with the technical solutions of embodiments of the present application, all of which fall within the protection scope of embodiments of the present application. Embodiments of the present application include at least part of the following content.

With the development of communications technologies, a communications system (for example, 5G) will integrate the market potentials for a satellite and a terrestrial network infrastructure. For example, 5G standards make a NTN, including a satellite segment, become a part of recognized 3rd generation partnership project (3GPP) 5G connection infrastructure.

A NTN is a network or a network segment that uses a radio frequency (RF) resource on a satellite or an unmanned aerial system (UAS) platform. With a satellite as an example, communications satellites are classified into low earth orbit (LEO) satellites, medium earth orbit (MEO) satellites, geostationary earth orbit (GEO) satellites, high elliptical orbit (HEO) satellites, and the like depending on different orbital altitudes. LEO is an earth-centered orbit with an altitude of 2000 km or less, or at least 11.25 periods per day, and an eccentricity less than 0.25. Most artificial objects in outer space are located in LEO. The LEO satellites operate around the earth at a high speed (mobility), but their orbits are predictable or determinable. Satellites with different orbital altitudes have different orbital periods.

LEO has a typical altitude ranging from 250 km to 1500 km, and an orbital period ranging from 90 minutes to 120 minutes.

MEO has a typical altitude ranging from 5000 km to 25000 km, and an orbital period ranging from 3 hours to 15 hours.

GEO has an altitude of about 35786 km, and an orbital period of 24 hours.

It may be learned from FIG. 2 and FIG. 3 in which a satellite is used as an example, a typical scenario of a NTN system accessing a terminal device involves a NTN transparent payload or a NTN regenerative payload. The bent pipe transponder architecture shown in FIG. 2 corresponds to the NTN transparent payload, and the regenerative transponder architecture shown in FIG. 3 corresponds to the NTN regenerative payload.

In a satellite communication-based NTN system, a coverage range of a serving cell is usually relatively large. A diameter of a NTN cell is at least 50 km. In some embodiments, the NTN cell may cover a plurality of cities deployed with TN cells, or may cover remote regions or ocean regions without TN cells.

In the NTN system, the satellite and the unmanned aerial system both have relatively strong mobility. A cell projected to the ground by the satellite may be fixed relative to the ground, or may move with the satellite. A serving cell corresponding to a LEO satellite is used as an example. A cell projected by the LEO satellite to the ground usually includes two modes: a quasi-earth fixed cell and a quasi-earth moving cell.

A cell that is relatively stationary to the ground may be a serving cell covering a fixed geographic region. For example, different LEO satellites achieve coverage over the same ground region by adjusting antenna pointing angles. When an LEO satellite cannot cover the region, it is replaced by another LEO satellite. For a satellite located on a geosynchronous orbit (GSO), a cell projected to the ground by the satellite may be a fixed cell. For a satellite located on a non-geosynchronous orbit (NGSO), the fixed cell may be served by a plurality of satellites that perform covering alternately.

For an earth fixed cell, a network (NW) may indicate, based on a service serving time (t-service), information about a time at which a cell provided by a NTN semi-static earth fixed (NTN quasi-earth fixed) system stops serving an area that is currently covered by the cell. The serving time may be used by the terminal device to start searching for a suitable cell before leaving a current cell, thereby ensuring service continuity.

The moving cell may be a serving cell covering a changing geographic region. For example, the cell projected by the LEO satellite to the ground may move with the satellite. Generally, when an antenna of the LEO satellite is perpendicular to the ground, a cell projected by the LEO satellite to the ground is a moving cell. Regardless of whether the LEO satellite serves as an independent base station or a relay base station, the moving cell moves with the LEO satellite, and a relative distance between the LEO satellite and the terminal device changes all the time. After a period of time, a signal of the LEO satellite may be incapable of covering the terminal device. If network deployment is relatively complete, a next LEO satellite may be to cover the terminal device. Since the satellite system is spherical, the next LEO satellite may come from any angle.

For an earth moving cell, a coverage range of a serving cell moves with a satellite. A network provides a reference location and a distance threshold of the serving cell for the terminal device, to estimate when the serving cell stops providing coverage for a current location of the terminal device. Alternatively, the terminal device may predict a moving track of the satellite by receiving ephemeris information of the satellite, so that a serving time of the satellite can be learned.

Some wireless communications systems may support communication between the terminal device and one or more satellites in the NTN. As described above, because satellites move continuously, cells or coverage areas supported by these satellites may also be moving. Due to movement of the cells, frequent changes of serving cells may also be seen even if the terminal device is in a still state. For example, the terminal device may determine replacement of a serving cell based on a change of a physical cell identity (PCI). In other words, the terminal device may maintain a connection to the NTN by performing handover (HO) between different cells.

It can be learned from FIG. 2 and FIG. 3 that, in the NTN system, a link between a terminal device and a satellite is a service link; and a radio link between a satellite and a gateway is a feeder link. Cell handover in the NTN system includes service link handover and feeder link handover. An LEO satellite is used as an example. For the purpose of maintenance or traffic unloading or in a case that the satellite is invisible to a current NTN gateway, the satellite may change the gateway connected thereto, that is, feeder link handover occurs. Feeder link handover further includes soft feeder link handover and hard feeder link handover. For soft feeder link handover, a NTN payload can be connected to more than one NTN gateway within a given time period, that is, temporary overlap may be ensured during feeder link handover. For hard feeder link handover, a NTN payload is connected to only one NTN gateway at any given time, that is, radio link interruption may occur during feeder link handover. From the perspective of the terminal device, the terminal device is connected to only one satellite at a time during hard handover.

For ease of understanding, a schematic flowchart of soft feeder link handover is described below with reference to FIG. 4. FIG. 4 depicts a handover process of a satellite 410 from a gateway 420 (GW1) to a gateway 430 (GW2) based on three time points. In FIG. 4, solid lines illustrate serving cells and feeder links between the satellite 410 and GW1; and dashed lines illustrate serving cells and feeder links between the satellite 420 and GW2.

Refer to FIG. 4. At the time T1, the satellite 410 provides a service for a terminal device in the cell $PCI_1$ by using the gateway 420. $PCI_1$ indicates that the cell is handled by a network device 1; and the cell may also be denoted as $PCI_{gNB1}$. At the time T1.5, the satellite 410 may be connected to both the gateway 420 and the gateway 430. In other words, the satellite 410 may be connected to both the gateways during the handover from the gateway 420 to the gateway 430. As shown in FIG. 4, all terminal devices in the cell $PCI_1$ need to be handed over to the cell $PCI_2$ ($PCI_{gNB2}$). At the time T2, a gateway corresponding to the satellite 410 has been switched from the gateway 420 to the gateway 430. The satellite 410 provides a service for a terminal device in the cell $PCI_2$ by using the gateway 430.

PCIs for cells are limited. For example, in LTE, there are 504 PCIs. However, in 5G, there are 1008 unique PCIs. As part of a network planning principle, neighboring cells are generally not allocated a same PCI. If the same PCI is allocated to the neighboring cells, only one of the neighboring cells can be synchronized during an initial cell search process for an overlapped region.

The cell in FIG. 4 may be an earth fixed cell, or may be an earth moving cell. Regardless of a stop time of the cell, a large quantity of terminal devices need to be handed over to a new cell having a different gateway.

A plurality of cell handover manners in the NTN system are described above with reference to FIG. 2 to FIG. 4. In a cell handover process of the NTN system, signalling interaction between a network device and a terminal device may cause relatively high overheads and delays. For example, as a part of a handover process, a terminal device or a source cell may select a target cell with respect to the handover process. Further, the source cell notifies the terminal device of a configuration of the target cell by using a signal, so that the terminal device may perform handover to the target cell based on the configuration of the target cell. For the NTN system, because a transmission distance between the network device and the terminal device is relatively long, signalling interaction in the handover process may increase overheads and transmission delays, no matter whether the signalling interaction is dynamic or real-time. In other words, selecting the target cell by the terminal device may increase associated overheads; and notifying the terminal device of the configuration of the target cell by the source cell by using the signal may also result in increased delays.

In addition, a NTN cell has a large coverage area and a large quantity of users. When a large quantity of terminal devices initiate cell handover simultaneously, overheads and delays may also be increased. For example, trace of a satellite slides on the earth as a low-orbit satellite moves. As mentioned above, the diameter of the NTN cell is at least 50 km, and the speed of the satellite is 7.56 km/s. In this case, every 6.61 seconds, up to 65519 terminal devices in the cell may need to be handed over from the source cell; and (up to 65519) new terminal devices need to be handed over to the target cell. In conclusion, at worst, a network needs to distribute 10,000 old terminal devices and submit 10,000 new terminal devices per second.

Further, because cell handover for a large quantity of terminal devices needs to be performed, the network device needs to transmit a large quantity of handover commands. From the perspective of resource utilization, it is inefficient to provide individual handover commands to each terminal device, because relatively large signalling overheads may be caused. In addition, for some terminal devices, this may mean that the network device may provide handover commands or radio link failures (RLF) too early. If the terminal device receives the handover command too early, it may be necessary to perform measurement and initiate an access process ceaselessly.

In summary, when a large quantity of terminal devices are handed over to the target cell simultaneously, congestion may occur in the target cell, which causes handover failures of some of the terminal devices. In other words, in a cell handover process, a large quantity of terminal devices simultaneously perform handovers from the source cell to the target cell, causing a sharp increase in control signalling. As a result, congestion occurs in the target cell, and a handover failure rate is high.

It should be noted that it is merely an example that a large quantity of terminal devices in the NTN system perform cell handovers, which cause problems of increases in overheads and delays as well as a high handover failure rate, as mentioned above. This embodiment of the present application may be applied to any type of scenarios in which a large quantity of terminal devices perform cell handovers simultaneously.

In view of this, an embodiment of the present application provides a cell handover method. In the method, a source network device groups some or all terminal devices in a cell into a plurality of sets of terminal devices, and transmits a handover command based on the sets of terminal devices. Due to handover grouping, a number of terminal devices that perform cell handover simultaneously is decreased, which is beneficial to reduce a failure rate of terminal device handover. For ease of understanding, a method provided in embodiments of the present application is described in detail below with reference to FIG. 5.

Refer to FIG. 5. In Step S510, a terminal device receives first information transmitted by a source network device to a first set of terminal devices.

The terminal device is any one of the terminal devices described above. In some embodiments, the terminal device is user equipment in a quasi-earth fixed cell or a quasi-earth moving cell of a NTN system. In some embodiments, the terminal device is a communications device that supports a NTN characteristic in both a GSO scenario and an NGSO scenario. For example, the terminal device supports mobility in the GSO and NGSO scenarios. In some embodiments, the terminal device is a device that supports handover grouping. For example, the terminal device may parse an information element (IE) of the network device for handover grouping. In some embodiments, the terminal device is a device that supports an R18 handover-related capability.

The source network device is a communications device that provides a service for the terminal device at a current time instant. The source network device may be a network device that moves relatively to the terminal device. In some embodiments, the source network device may be a base station in the NTN system that provides a service through a satellite. For example, the source network device may be a satellite. In some embodiments, the source network device may be a non-satellite mobile network device. For example, the source network device is a base station installed on a low-altitude aircraft.

That a terminal device receives first information transmitted by a source network device to a first set of terminal devices may indicate that the terminal device is a terminal device in the first set of terminal devices, and may also be described as that the terminal device corresponds to the first set of terminal devices. As a terminal device in the first set of terminal devices, the terminal device may receive information transmitted by the source network device to the first set of terminal devices.

The first set of terminal devices may also be referred to as a first terminal device group. The first set of terminal devices is one of a plurality of sets of terminal devices in a source cell. In some embodiments, terminal devices served by the source cell may be grouped according to a specific rule, thereby forming the plurality of sets of terminal devices. In embodiments of the present application, the terminal devices may be grouped according to handover demands. The grouping may also be referred to as handover grouping. A set of terminal devices may also be referred to as a handover group. The first set of terminal devices obtained via handover grouping may also be referred to as a first handover group.

The plurality of sets of terminal devices are determined based on grouping information. In some embodiments, the grouping information may be transmitted by the source network device to the terminal device, and is used by the terminal device to determine the corresponding first set of terminal devices. The terminal device determining the first set of terminal devices means that the terminal device is a terminal device in the first set of terminal devices. In other words, the set of terminal devices to which the terminal device belongs is referred to as the first set of terminal devices. In some embodiments, the source network device may directly group terminal devices in the source cell based on the grouping information.

The plurality of sets of terminal devices in the source cell may be determined based on different parameter thresholds, or may be determined based on a division manner of coverage areas of the source cell, or may be determined based on a cell type of the source cell. For example, the plurality of sets of terminal devices in the source cell may be divided and obtained based on distances of the terminal devices from an edge of the cell. The terminal devices whose distances therefrom are within a specific range belong to a same set of terminal devices. For another example, when the source cell is divided into a plurality of virtual/fine regions, the plurality of sets of terminal devices may correspond to a plurality of sub-regions. For another example, the plurality of sets of terminal devices may be divided and obtained in different manners based on characteristics of a moving cell and a fixed cell. Grouping manners of the plurality of sets of terminal devices are described in detail below with reference to a parameter threshold, FIG. 7, and FIG. 8.

In some embodiments, the grouping information may include one of the following: a parameter threshold used for determining the plurality of sets of terminal devices; a plurality of sub-regions in the source cell; and group identifiers corresponding to the plurality of sets of terminal devices.

In some embodiments, the grouping information includes the parameter threshold used for determining the plurality of sets of terminal devices. The parameter threshold being used to determine the plurality of sets of terminal devices means that a plurality of parameter ranges are set based on the parameter threshold, thereby grouping a plurality of terminal devices into different sets. The parameter threshold may be a threshold determined based on parameters such as distance, time, and signal quality. For example, when the parameter threshold is related to a distance, different distance ranges may correspond to different sets of terminal devices.

In a possible implementation, one or more quantized parameters may be determined based on the parameter threshold. A plurality of different parameter ranges may be determined based on a plurality of quantized parameters with different sizes. The terminal device may select a cell handover occasion based on the parameter ranges, thereby avoiding performing handovers simultaneously by a large quantity of terminal devices. The parameter threshold and the quantized parameter are exemplarily described below with reference to a manner of determining the set of terminal devices.

In a possible implementation, when the grouping information includes the parameter threshold used for determining the plurality of sets of terminal devices, the grouping information is further used to trigger the terminal device to determine a first parameter corresponding to the parameter threshold. The terminal device may determine the first set of terminal devices based on the first parameter.

The first parameter may be determined by the terminal device via measurement, or may be determined based on system information or other information. For example, the terminal device may determine a distance to the edge of the cell via real-time measurement/periodic measurement. For another example, in a quasi-earth fixed cell, the terminal device may determine, based on the system information, a time at which the source cell stops providing a service. For still another example, in a quasi-earth moving cell, the terminal device may determine, based on ephemeris information, a time at which a target cell starts to provide a service, or estimate, based on ephemeris information, an average time of residence in the moving cell.

For example, the terminal device may perform measurement based on the grouping information to obtain the first parameter, or may determine the first parameter based on a normal measurement period. For example, the terminal device may determine, based on the parameter threshold, a first parameter that needs to be measured, and determine, via measurement, a first parameter corresponding to the terminal device. In this case, the grouping information may include measurement information. The measurement information may be used to trigger the terminal device to perform measurement, so as to obtain the first parameter. For example, when the parameter threshold is a distance threshold, the first parameter to be measured by the terminal device may be a distance between the terminal device and the edge of the cell, or may be a distance from the terminal device to a location where a specified measurement is initiated for the distance threshold. For another example, when the parameter threshold is a quality threshold, the first parameter to be measured by the terminal device may be reference signal received power (RSRP).

For example, the terminal device may directly determine, based on the parameter threshold, the first parameter corresponding thereto. For example, when the parameter threshold is related to a serving time of the source cell, the first parameter is information about a time at which the source cell stops providing a service for the terminal device. In this case, the terminal device may determine, based on a reference location of the source cell in the system information, a service stop time or an estimated average time of residence in a moving cell.

In a possible implementation, when the grouping information includes the parameter threshold used for determining the plurality of sets of terminal devices, the source network device may further notify the terminal device of a manner of grouping the terminal devices in the source cell. The terminal device may determine, based on a grouping manner for the plurality of sets of terminal devices and/or based on a corresponding first parameter, the set of terminal devices to which the terminal device belongs.

In some embodiments, the grouping information includes a plurality of sub-regions in the source cell. A quantity of sub-regions into which a NTN cell is divided during sub-region division of the cell is the same as a quantity of the sets of terminal devices. The terminal device may determine the first set of terminal devices based on a sub-region in which the terminal device is located.

In a possible implementation, the plurality of sub-regions in the source cell may refer to a plurality of virtual/fine regions into which the source cell is subdivided. The plurality of terminal devices in the source cell may be grouped based on the plurality of sub-regions, to obtain the plurality of sets of terminal devices. For example, users in each sub-region of the NTN cell belong to one group so as to facilitate the transmission of a handover command by the network device, because it is highly probable that the time it takes for the terminal devices in each sub-region to reach the edge of the cell are on the same order of magnitude.

In a possible implementation, for a quasi-earth fixed cell, considering that a diameter of a NTN cell is at least 50 km, a coverage area of the NTN cell may be divided into a plurality of virtual/fine regions. In other words, the plurality of sets of terminal devices may be divided based on divided sub-regions of the coverage area. For example, a coverage range of the NTN cell may be divided into n equal sub-regions. For another example, a plurality of sub-regions obtained by dividing the NTN cell may unequally divide the coverage area of the NTN cell.

In a possible implementation, the sub-regions in the source cell may be determined based on one or more of the following: a coverage angle of the source network device; a direction of a synchronization signal block (SSB) beam transmitted by the network device; or a geographical characteristic of a coverage area of the source cell. A detailed description is made below with reference to FIG. 7 and FIG. 8.

In some embodiments, the grouping information may include the group identifiers corresponding to the plurality of sets of terminal devices. The group identifiers corresponding to the plurality of sets of terminal devices refer to identifier symbols that are used to determine each set of terminal devices. The group identifier of each set of terminal devices may be a unique identifier of the set of terminal devices. The group identifier is, for example, a group radio network temporary identifier (RNTI).

In a possible implementation, the source network device may provide a terminal device in a specific group (a specific set of terminal devices) with a corresponding group RNTI. The terminal device may receive, based on the group RNTI, signalling related to the set (group) of terminal devices to which the terminal device belongs, for example, a group handover command. For example, the group identifier may be used by the terminal device to decode a message allocated by the source network device for the set of terminal devices. The message is, for example, measurement, a handover command, or a target cell configuration.

For example, the source network device may transmit a corresponding group handover command to the terminal device by using broadcast, multicast, or dedicated signalling. The terminal device may initiate cell handover based on the group handover command. The group handover command may include common handover information to assist in the handover, or may include a dedicated handover instruction for the terminal device, or may include common handover information and a dedicated handover instruction. Content of the group handover command may be determined based on a transmitting manner, or may be determined by the source network device on its own.

In a possible implementation, the source network device may further transmit, to the target network device, group identifiers corresponding to the plurality of sets of terminal devices, so as to facilitate the target network device in establishing a connection to the terminal device.

In some embodiments, the grouping information may include the plurality of types of information described above. For example, the grouping information may include: the parameter threshold used for determining the plurality of sets of terminal devices, and the group identifiers corresponding to the plurality of sets of terminal devices. After receiving the grouping information, the terminal device may determine, via measurement, whether the terminal device is in the plurality of sets of terminal devices, or may determine a group identifier of the set of terminal devices to which the terminal device belongs. Further, the terminal device may parse, based on the group identifier, the first information transmitted by the source network device and related to the set of terminal devices to which the terminal device belongs.

In some embodiments, the grouping information may be transmitted by using one or both of the following: a broadcast message, or downlink control information. For example, the source network device may transmit the grouping information by using the broadcast message, so as to trigger the terminal device to perform measurement on a distance threshold. For another example, the source network device may transmit the grouping information by using a physical downlink control channel (PDCCH).

In a possible implementation, periodic measurement may be triggered after each terminal device in the cell receives a broadcast message including the grouping information or information transmitted by using a PDCCH. When the terminal device reports a measurement report in a region determined based on the parameter threshold and the quantized parameter, the source network device may transmit a handover command to the terminal device. For example, when the quantized parameter is δ, a region δ corresponding to a specific parameter range may be determined with reference to the parameter threshold. When the terminal device reports the measurement result to the network device in the region δ, the network device may transmit a handover command. Optionally, the terminal device may determine, based on a measurement result, a set of terminal devices (handover group) to which the terminal device belongs. In a case that the terminal device receives the handover command, when determining that the first set of terminal devices to which the terminal device belongs needs to perform cell handover, the terminal device may optionally initiate an access procedure based on the handover command transmitted by the source network device.

In some embodiments, if the terminal device needs to receive the grouping information, the terminal device may notify, before receiving the information, the network device of its capability of parsing the handover grouping information. In other words, the terminal device may report to the network device that the terminal device supports handover grouping based on a set of terminal devices, and may determine, based on the grouping information, the set of terminal devices to which the terminal device belongs. For example, the terminal device may transmit capability information of the terminal device to the source network device, where the capability information is used to indicate that the terminal device supports cell handover based on a set of terminal devices.

In some embodiments, how and when to group the terminal devices depends on network implementation. For example, the source network device may group the terminal devices within a specified time before the source cell stops providing service. The grouping may be performed based on a specified parameter threshold, or may be performed based on the plurality of sub-regions in the source cell.

In a possible implementation, the capability information may be transmitted in a plurality of manners. For example, the terminal device may add, to a radio resource control (RRC) connection request, information that supports handover grouping. For another example, the terminal device may directly report, in capability reporting information, the information that supports handover grouping. For still another example, the terminal device may add information elements that support the R18 handover-related capability, and indicate, by using these information elements, that the terminal device supports handover grouping. In a specific example, the information element added by the terminal device is, for example, non TerrestrialNetwork-r18, for example, ntn-ScenarioSupport-r18, where non Terrestrial-Network-r18 may indicate whether the terminal device supports an NR NTN access; and ntn-ScenarioSupport-r18 may indicate whether an NT characteristic is supported in a GSO or NGSO scenario. It should be noted that if the terminal device supports nonTerrestrialNetwork but does not include ntn-ScenarioSupport, it may indicate that the terminal device supports the NTN characteristic in both the GSO and NGSO scenarios, and also supports mobility in both the GSO and NGSO scenarios.

In some embodiments, if the terminal device does not receive the grouping information, the terminal device may establish an RRC connection with a source network device (e.g., a source gNB) in the NTN. In other words, when the terminal device cannot determine the first set of terminal devices to which the terminal device belongs, the terminal device may receive, by means of an RRC message, first information and/or a handover command transmitted by the source network device. For example, the terminal device may establish a connection to the source network device by using an RRC connection and reconfiguration.

In a possible implementation, after establishing the connection to the source network device, the terminal device may receive the first information and/or the handover command that is/are broadcast or multicast by the source network device to a plurality of terminal devices. For example, the source network device may transmit the handover command to the terminal device based on a NTN sub-region to which the terminal device belongs or based on the measurement report of the terminal device.

Referring back to Step S510, the first information transmitted by the source network device to the first set of terminal devices means that the first information is transmitted based on a set of terminal devices, and is not transmitted separately to the terminal device. Generally, the source network device may conduct transmission in a broadcast or multicast manner, thereby reducing signalling overheads and improving resource utilization.

The first information may be used to assist at least some of terminal devices in the first set of terminal devices in handover from a source cell corresponding to the source network device to a target cell corresponding to a target network device. The at least some of terminal devices in the first set of terminal devices may be all the terminal devices in the first set of terminal devices, or may be some terminal devices differentiated by their type.

The target network device is a communications device that provides a service for the terminal device after the source network device provides the service for the terminal device. In some embodiments, the target network device may be determined by the terminal device and/or the source network device itself. For example, when the target network device may be a satellite in the NTN system, mobility of the terminal device may be ignored compared with that of the satellite. The terminal device may predict, based on a pre-defined satellite orbit, a next target cell that provides the service for the terminal device. For another example, the target network device may be a non-satellite mobile network device. The source network device may determine, based on a preset parameter, the target network device that provides the service for the terminal device. For another example, a cell corresponding to a satellite moves over time in a predictable manner. Thus, instead of depending on the measurement report of the terminal device, the satellite may estimate the target cell based on its own moving speed, direction, and height from the ground. Once the satellite moves to a new cell, most of terminal devices are handed over to the same target cell.

In some embodiments, the first information is information that is used for handover and that may be shared by at least some of the terminal devices in the first set of terminal devices. The first information may include a plurality of types of information used for assisting the terminal device in the handover.

For example, the first information includes common handover information corresponding to the first set of terminal devices. Because a large quantity of terminal devices perform handover simultaneously, a part of handover information corresponding to each group of terminal devices or all terminal devices is the same. This part of the handover information may be the common handover information. For at least some of the terminal devices in the first set of terminal devices, after the first information is received, it means that the common handover information is received. The source network device generates the common handover information for one set of terminal devices or all terminal devices, so that signalling overheads can be reduced.

It should be noted that the first information cannot be equivalent to the handover command transmitted by the source network device. Each handover command should be specific to each terminal device. For example, the common handover information in the first information may assist the terminal device in handover. However, before initiating handover, the terminal device still requires the handover command transmitted by the source network device to the terminal device. In embodiments of the present application, after receiving the handover command, the terminal device may determine, based on first auxiliary information, whether to perform cell handover immediately. A specific description is made below with reference to FIG. 6.

In some embodiments, the first information includes a common configuration of the target cell. The common configuration is, for example, IE Reconfiguration WithSync, and may alternatively be, for another example, ServingCell-ConfigCommon in a timer T304.

For example, an NR NTN transmits first downlink information to all terminal devices or a set of terminal devices in a coverage area of a satellite via broadcast or multicast. The source network device may broadcast or multicast common configurations of other cells by using the first information. For example, in a broadcast manner, the source network device may introduce a new system information block (SIB) to carry these common configurations. For another example, in a multicast (groupcast) manner, the source network device may need a new signalling radio bearer (SRB) to carry a common configuration of point-to-multipoint (PTM) transmission. For still another example, the source network device may provide the terminal device with a common configuration (namely, a SIB1) of the target cell and an ephemeris (SIB19) of the target cell as a common service data unit (SDU) in a group handover command. The common SDU in the handover command may follow a sequence of a specific handover command for the terminal device.

In some embodiments, the first information may further indicate second auxiliary information of the target cell and/or a neighboring cell corresponding to the source cell. In other words, the first information may include the second auxiliary information of the target cell and/or the neighboring cell. The neighboring cell is one or more neighboring cells of the source cell.

The second auxiliary information may be valid information or a parameter that may be used by the terminal device for performing cell handover. Considering requirements for mobility and measurement of an NR NTN and an IoT NTN, the source network device needs to provide the terminal device with the second auxiliary information of the neighboring/target cell.

In a possible implementation, the second auxiliary information may be transmitted by extending one or more SIBs, or may be transmitted by introducing a new SIB. In other words, a parameter in the second auxiliary information may be implemented using an existing SIB or a new SIB. In an implementation, the network device may extend an existing SIB to transmit information about the target cell or the neighboring cell. For example, SIB31 is extended to include additional neighboring cell information. For another example, SIB32 is extended to be reused for a measurement of the neighboring cell. For still another example, SIB3/4/5 is extended to transmit one or more pieces of information in the second auxiliary information. In another implementation, a new SIB is introduced to carry the second auxiliary information. For example, a new SIB is used to carry information of the neighboring cell.

In a possible implementation, the second auxiliary information may include one or more of the following: ephemeris information of a satellite corresponding to the target cell and/or the neighboring cell; a validity period of the target cell and/or the neighboring cell; a timing advance (TA) corresponding to the target cell and/or the neighboring cell; an identity (ID) of a satellite corresponding to the target cell and/or the neighboring cell; a frequency and/or a cell list of the target cell and/or the neighboring cell; location information of the target cell and/or the neighboring cell; a serving time of the target cell and/or the neighboring cell; or a cell type corresponding to the target cell and/or the neighboring cell.

For example, the second auxiliary information may include the ephemeris information of the satellite corresponding to the target cell and/or the neighboring cell. The satellite corresponding to the target cell and/or the neighboring cell may be a satellite related to the target cell or the neighboring cell. The ephemeris information of the satellite may include an ephemeris of the satellite and an optional epoch time.

For example, the second auxiliary information may include a validity period of the target cell and/or the neighboring cell. The validity period may be determined based on the epoch time. When independent validity period duration fields for neighboring cells are introduced in the second auxiliary information, it is necessary to consider whether the terminal device maintains an independent validity timer for each neighboring cell. Further, it is also necessary to consider a behavior of the terminal device when each validity timer expires. For example, the terminal device may set corresponding timers for the target cell and each neighboring cell, thereby performing update in time. Validity period duration is included in a new SIB. Independent validity period duration is required.

In an example, due to a size limitation of a transport block set (TBS), the source network device may be incapable of broadcasting information about all satellites. When measurement is configured in a connected mode, the source network device may expect the terminal device to perform measurement of a cell associated with a satellite whose information is not broadcast. In this case, the source network device may provide all necessary satellite information by using dedicated information.

For example, the second auxiliary information may include a TA corresponding to the target cell and/or the neighboring cell. The parameter TA is a parameter TA common to the target cell or the neighboring cell.

For example, the second auxiliary information may include location information of the target cell and/or the neighboring cell. The location information may be a reference location of the cell, or may be a distance threshold of the cell, or may be a radius/a diameter of a coverage range of the cell.

For example, the second auxiliary information may include a serving time of the target cell and/or the neighboring cell. For a moving cell, the serving time may be related to trace information of a satellite. For a fixed cell, the serving time may include a time at which the satellite starts to provide a service and a time at which the satellite stops providing the service.

For example, the second auxiliary information may further provide additional information related to the neighboring cell, such as beam information or a location, which is not limited herein.

It should be noted that some information in the second auxiliary information may be applicable only to an R18 terminal device, because a conventional terminal device (for example, an R17 terminal device) does not understood the information.

It may be learned from FIG. 5 that, in embodiments of the present application, some or all of terminal devices in a source cell are grouped into a plurality of sets of terminal devices. A source network device transmits, based on the set of terminal devices, first information used for assisting the terminal device in cell handover. According to such cell handover method, signalling overheads during handover performed by a large quantity of terminal devices simultaneously may be reduced, thereby improving resource utilization.

It may be learned from the foregoing description that the first information transmitted by the source network device is used to assist the terminal device in the handover. For each terminal device, a specific handover command is also required. If the terminal device performs the cell handover immediately after receiving the handover command, the execution of a current service may be affected.

To resolve this problem, an embodiment of the present application further provides a cell handover method. According to this method, a terminal device may determine, based on first auxiliary information, whether to perform cell handover immediately. In other words, a cell handover occasion is determined by the terminal device, which is beneficial to improving a handover effect and increasing transmission efficiency. A method for performing the cell handover by the terminal device based on the first auxiliary information is described in detail below with reference to FIG. 6. FIG. 6 shows a procedure related to the method shown in FIG. 5. Therefore, for brevity, the terms that have already been presented in FIG. 5 are not explained in detail again in FIG. 6.

With reference to FIG. 6, in Step S610, the terminal device receives a handover command transmitted by a source network device.

The handover command is used to instruct the terminal device to perform handover from a source cell to a target cell. The handover command is a handover instruction specific to the terminal device. A handover instruction shared by a plurality of terminal devices may be transmitted by using first information that is multicast or broadcast.

In some embodiments, because the first information includes common handover information, the terminal device may perform cell handover with reference to the handover command and the first information described above. In a possible implementation, the handover command may be transmitted after transmission of the first information.

The handover command received by the terminal device may be transmitted by the source network device based on a measurement report of the terminal device, or may be directly transmitted by the source network device.

In some embodiments, the terminal device may determine, based on measurement, a first set of terminal devices to which the terminal device belongs. When the terminal device finds that the first set of terminal devices is one of a plurality of sets of terminal devices that needs to initiate handover immediately, the terminal device may transmit the measurement report to the source network device. The terminal device transmits the measurement report to instruct the source network device to deliver the handover command corresponding to the terminal device.

In a possible implementation, an occasion when the terminal device transmits the measurement report for requesting the handover may be before the transmission of the first information by the source network device, or may be after the transmission of the first information.

In a possible implementation, when the terminal device periodically transmits the measurement report, the source network device may determine, based on the set of terminal devices to which the terminal device belongs, whether to transmit the handover command. For example, the source network device may transmit the handover command when the terminal device enters a set of terminal devices as determined based on a parameter threshold and a quantized parameter. The terminal device may perform the handover immediately or may not perform the handover immediately. For another example, the source network device may transmit the handover command when the terminal device enters a specific set of terminal devices.

In some embodiments, the source network device may directly transmit the handover command to the terminal device. For example, if distances between an edge of a cell and the sets of terminal devices corresponding to sub-regions in grouping information are different, the source network device may directly transmit the handover command to a set of terminal devices that is closest to the edge of the cell.

In a possible implementation, a network device may estimate a location of the terminal device by using a global navigation satellite system (GNSS) or by capturing location information from a core network. After determining the location of the terminal device, the network device may determine, based on a sub-region division manner, the set of terminal devices to which the terminal device belongs. If cell handover needs to be immediately performed for a sub-region corresponding to the set to which the terminal device belongs, the source network device transmits handover commands based on different sets. For example, for a set of terminal devices corresponding to a sub-region that is closest to the edge of the cell, the source network device transmits the handover command to all terminal devices in the set, and does not transmit any handover command to terminal devices in other sets.

In Step S620, the terminal device determines, based on first auxiliary information, whether to perform cell handover immediately. In other words, after receiving the handover command, the terminal device may perform the cell handover immediately, or may not perform the cell handover immediately.

The first auxiliary information may include one or more of the following: a handover relaxation amount corresponding to the terminal device; a set of terminal devices to which the terminal device belongs; information about a service of the terminal device upon receiving the handover command; first determination performed by the terminal device; or handover wait indication information transmitted by the source network device.

In some embodiments, the terminal device may determine, based on the information about the service of the terminal device upon receiving the handover command, whether to perform cell handover immediately. The service may be a service that is being executed when the terminal device receives the handover command, or a service that is to be executed when the terminal device receives the handover command. The service to be executed may be a service of a time instant next to the time instant at which the handover command is received. The information about the service may be information related to a service mode, service content, a service priority, and a time required for the service. For example, when the terminal device receives the handover command, if there is a downlink (DL) or uplink (UL) data service, the related information of the data service may be used by the terminal device to determine whether to perform the cell handover immediately.

In a possible implementation, the terminal device may determine, based on time information of the service, whether to perform cell handover immediately. For example, if the information about the service indicates that a time at which the terminal device completes the service is less than or equal to a specified value, the terminal device may select not to perform the handover currently, but perform the cell handover only after the service is completed. The specified value may be referred to as a third time threshold. For example, when the terminal device finds that there is a data service, the terminal device may obtain the service at the next time instant and the timestamp information from an application layer. If a serving time of the service is earlier than or equal to the third time threshold, the terminal device may perform the handover after the transmission for the service is completed. If the time at which the service is completed is greater than the third time threshold, the terminal device may perform the cell handover immediately.

In another possible implementation, the terminal device may determine, based on priority information of the service, whether to perform cell handover immediately. For example, when the terminal device receives the handover command, if it is found that a priority of the service of the next time instant is relatively high, the terminal device may not perform the cell handover immediately.

In another possible implementation, after receiving the handover command, the terminal device may initiate handover, or determine, based on an uplink or downlink service mode of the terminal device and a time required by the service, whether to initiate the handover.

In some embodiments, the terminal device may determine, based on a set of terminal devices to which the terminal device belongs, whether to perform cell handover immediately. After determining a handover group to which the terminal device belongs, the terminal device may know when to leave the source cell, thereby determining whether to perform cell handover. For example, in a plurality of sets of terminal devices determined based on a distance threshold $D_{target}$, the terminal device in the first set of terminal devices initiates a handover behavior only when a distance range corresponding to the set is $[D_{target}-\delta_n, D_{target}-\delta_{n-1}]$. The quantized parameter $\delta$ is described in detail later.

In some embodiments, the terminal device may determine, based on the first determination as performed, whether to perform cell handover immediately. The first determination may be performed based on the foregoing service information, or may be performed based on an instruction from the source network device. A decision criterion in which the terminal device performs the first determination is determined by the terminal device. In other words, the terminal device determines by itself whether to perform the cell handover immediately in a current situation, without asking the network device for an instruction.

In some embodiments, the terminal device may determine, based on the handover relaxation amount, whether to perform cell handover immediately. The handover relaxation amount is a time period from transmitting the handover command by the network device to initiating the handover by the terminal device. The handover relaxation amount may be set by the network device, or may be determined based on one or more pieces of information.

In a possible implementation, the information for determining the handover relaxation amount may include: the set of terminal devices to which the terminal device belongs; and a quality of service (QOS) requirement for a service corresponding to the terminal device.

For example, the terminal device determining the handover relaxation amount based on the first set of terminal to which the terminal device belongs means that the handover relaxation amount may be indicated based on the grouping of the terminal devices. Handover relaxation amounts corresponding to all terminal devices in each set of terminal devices may be the same. For example, handover relaxation amounts corresponding to different sets of terminal devices may be the same or may be different.

For example, a handover relaxation amount of a terminal device may be determined based on a QoS of a service. For example, a handover relaxation amount of a terminal device corresponding to a low-speed service may be set to a value greater than that of a terminal device corresponding to a high-speed service.

In some embodiments, the terminal device may determine, based on the handover wait indication information transmitted by the source network device, whether to perform cell handover immediately, to reduce or avoid a large quantity of random accesses (RA) generated by all terminal devices. In other words, the terminal device may execute a handover wait mechanism before transmitting an uplink handover complete message. The handover wait mechanism may also be referred to as a random backoff mechanism. The handover wait indication information may also be referred to as a wait/backoff indicator.

In a possible implementation, when the source network device transmits the handover command, the handover wait indication information may be included, that is, the source network device may tell the terminal device how long the terminal device needs to wait to start handover. The terminal device may initiate a random access procedure with a target network device on a random access channel based on the handover wait indication information.

In a possible implementation, a wait time corresponding to the handover wait mechanism may be determined based on one or more of the following: a service type of the terminal device; a set of terminal devices to which the terminal device belongs; or a handover relaxation amount corresponding to the terminal device.

For example, the source network device may set different wait times based on the service type of the terminal device.

For example, the terminal device may notify, by using an RRC reconfiguration message, the source network device of a set of terminal devices to which the terminal device belongs; and the source network device may determine a corresponding wait time based on the set of terminal devices.

For example, the terminal device may notify the source network device of candidate cells by using an RRC reconfiguration message, so as to facilitate the source network device in determining a wait time for the terminal device.

For example, the terminal device may notify the source network device of the handover relaxation amount by using an RRC reconfiguration message; and the source network device may indicate a wait time of the terminal device based on the handover relaxation amount.

For example, the source network device may alternatively determine a wait time for the terminal device based on a NTN sub-region.

In some embodiments, if the handover command indicates that a PCI of the target cell conflicts with a PCI of the source cell, the terminal device may determine the target cell by using an SSB beam. For example, when the coverage areas of two satellites overlap with each other, the terminal device may be notified, by using system information of the previous cell, of a new PCI for the target cell in advance. If the PCIs of the target cell and the source cell conflict with each other, the two satellites perform transmission by using different SSB beams while the coverage areas are overlapped. Because different SSB beams correspond to different SSB indexes, the terminal device may determine the target cell based on received SSB beams. If the target cell and the source cell use different PCIs, there is no interference issue. When a service serving time expires, the terminal device uses a PCI of the target cell to update configuration, performs downlink synchronization with the target cell, and then accesses the target cell. The following describes a PCI conflict scenario with reference to FIG. 9 by using a quasi-earth fixed cell as an example.

In some cases of the quasi-earth fixed cell, no PCI conflict occurs. For example, for hard satellite switches with a same SSB frequency and a same gNB (without any key change), satellite switches whose PCIs do not change are supported. Because no PCI is changed, no PCI conflict occurs.

It may be learned from FIG. 6 that as the terminal device determines, based on the first auxiliary information, whether to perform cell handover immediately, congestion caused when a large quantity of terminal devices perform handover simultaneously can be avoided. Determining the first auxiliary information based on a plurality of types of information is beneficial for the terminal device or the source network device to flexibly determine a terminal device that performs the cell handover at a specific time instant.

Cell handover methods provided in embodiments of the present application are described above with reference to FIG. 5 and FIG. 6, where a manner of determining the plurality of sets of terminal devices needs to be taken into consideration. As mentioned above, a parameter threshold used for determining the plurality of sets of terminal devices may be related to parameters corresponding to terminal devices, such as distance, time, and signal quality. In some embodiments, the parameter threshold may be related to one or more of the following: a distance between the terminal device and an edge of the source cell; a time at which the source cell stops providing a service for the terminal device; a time at which the target cell starts to provide a service for the terminal device; or quality of a reference signal received by the terminal device. For ease of understanding, specific manners of determining a plurality of sets of terminal devices based on a plurality of parameter thresholds are separately described below as an example.

In a possible implementation, the parameter threshold may include a distance threshold for the distance between the terminal device and the edge of the source cell. In other words, a parameter threshold in grouping information is determined based on a distance. The parameter threshold is the distance threshold for the distance between the terminal device and the edge of the source cell. When the distance between the terminal device and the edge of the source cell is less than the distance threshold, the terminal device may initiate measurement and a subsequent handover procedure.

For example, the distance threshold may be used to determine a plurality of sets of terminal devices. For example, the terminal devices whose distances to the edge of the source cell are less than the distance threshold belong to a set of terminal devices, and the terminal device whose distance to the edge of the source cell is greater than or equal to the distance threshold belongs to another set of terminal devices.

For example, a plurality of distance ranges may be determined based on the distance threshold with reference to one or more quantized parameters; and the plurality of distance ranges correspond to a plurality of sets of terminal devices. In other words, the distance ranges corresponding to the plurality of sets of terminal devices are determined based on the distance threshold and one or more quantized parameters that are based on the distance threshold. The quantized parameter may be determined based on the distance threshold, or may be determined by the source network device. For example, the distance threshold is evenly divided into a plurality of distance values, thereby obtaining a plurality of quantized parameters. Two adjacent distance values may define one distance range. For another example, the source network device may set a plurality of quantized parameters having different values, thereby obtaining a plurality of distance values. Two adjacent distance values may define one distance range. The terminal devices whose distances to the edge of the source cell are within a same distance range belong to a same set of terminal devices.

In a specific embodiment, the distance threshold is denoted as $D_{target}$, and a distance range is determined by setting $D_{target} \pm \delta$. N quantized parameters $\delta_1, \delta_2, \delta_i, \ldots,$ and $\delta_N$ may be obtained by quantizing $\delta$, where i is a natural number ranging from 0 to N−1; and $\delta_1, \delta_2, \delta_i, \ldots,$ and $\delta_N$ are rational numbers. The N quantized parameters may increase sequentially, for example, $\delta_1 < \delta_2 < \delta_3 \ldots < \delta_n$. 2N distance values $D_{target} \pm \delta_1, D_{target} \pm \delta_2, D_{target} \pm \delta_i, \ldots,$ and $D_{target} \pm \delta_N$ may be obtained based on the N quantized parameters. 2N distance ranges may be determined based on the distance threshold and the 2N distance values. Therefore, based on a quantization dimension of $\delta$, users of a NTN cell may be divided into 2N user handover groups, namely, 2N sets of terminal devices. A value of N may be configured flexibly. For example, the value of N may be related to a coverage area. A value of N in a relatively dense coverage area is relatively large.

In an example, the 2N sets of terminal devices may meet the following condition: if a distance between the terminal device and the edge of the source cell is greater than or equal to $D_{target}$, a distance range corresponding to the set of terminal devices to which the terminal device belongs may be $(D_{target} + \delta_i, D_{target} + \delta_{i+1}]$; or if a distance between the terminal device and the edge of the source cell is less than $D_{target}$, a distance range corresponding to the set of terminal devices to which the terminal device belongs may be $(D_{target} - \delta_{i+1}, D_{target} - \delta_i]$, where $\delta_i < \delta_{i+1}$; and $\delta_0$ is 0.

In a possible implementation, the parameter threshold may include a first time threshold at which the source cell stops providing a service for the terminal device. A time at which the source cell stops providing the service for the terminal device may mean that the source cell stops providing the service after this time. For a quasi-earth fixed cell and a quasi-earth moving cell, the first time threshold may be determined based on a service serving time of the source cell, or may be a service serving time (t-service) of the source cell. In this case, a parameter threshold in grouping information is determined based on a time. The time threshold is the first time threshold when the source cell stops providing the service for the terminal device. When a time at which the source cell stops providing the service for the terminal device is after the first time threshold, the terminal device may initiate measurement and a subsequent handover procedure.

For example, the first time threshold may be used to determine a plurality of sets of terminal devices. For example, the terminal devices for which the source cell stops providing the service after the first time threshold belong to one set of terminal devices; and the terminal devices for which the source cell stops providing the service before the first time threshold belongs to another set of terminal devices.

For example, a plurality of time ranges may be determined based on the first time threshold with reference to one or more quantized parameters; and the plurality of time ranges correspond to a plurality of sets of terminal devices. In other words, the time ranges corresponding to the plurality of sets of terminal devices are determined based on the first time threshold and one or more quantized parameters that are based on the first time threshold. The quantized parameter may be determined based on the first time threshold, or may be determined by the source network device. For example, the first time threshold is evenly divided into a plurality of time points, thereby obtaining a plurality of quantized parameters. Two adjacent time points may define one time range. For another example, the source network device may set a plurality of quantized parameters having different values, thereby obtaining a plurality of time points. Two time points whose values are adjacent to each other may define one time range. The terminal devices for which the source cell stops providing the service within a same time range belong to a same set of terminal devices.

In a specific embodiment, when the first time threshold is a service serving time, the first time threshold is denoted as $T_{service}$. $T_{service} \pm \delta$ is set based on the threshold to determine a time range.

In a specific embodiment, the first time threshold is denoted as $T_{target1}$; and $T_{target1} \pm \delta$ is set to determine a time range. N quantized parameters $\delta_1, \delta_2, \delta_i, \ldots,$ and $\delta_N$ may be obtained by quantizing $\delta$, where i is a natural number ranging from 0 to N−1; and $\delta_1, \delta_2, \delta_i, \ldots,$ and $\delta_N$ are rational numbers. The N quantized parameters may increase sequentially, for example, $\delta_1 < \delta_2 < \delta_3 \ldots < \delta_n$. 2N time points $T_{target1} \pm \delta_1, T_{target1} \pm \delta_2, T_{target1} \pm \delta_i, \ldots,$ and $T_{target1} \pm \delta_N$ may be obtained based on the N quantized parameters. 2N time ranges may be determined based on the first time threshold and the 2N time points. Therefore, based on a quantization dimension of $\delta$, users of a NTN cell may be divided into 2N user handover groups, namely, 2N sets of terminal devices. A value of N may be configured flexibly. For example, the value of N may be related to a coverage area. A value of N in a relatively dense coverage area is relatively large.

In an example, the 2N sets of terminal devices may meet the following condition: if a time at which the source cell stops providing the service for the terminal device is greater than or equal to $T_{target1}$, a time range corresponding to the set of terminal devices to which the terminal device belongs may be $(T_{target1} + \delta_i, T_{target1} + \delta_{i+1}]$; or if a time at which the source cell stops providing the service for the terminal device is less than $T_{target1}$, a time range corresponding to the set of terminal devices to which the terminal device belongs may be $(T_{target1} - \delta_{i+1}, T_{target1} - \delta_i]$, where $\delta_i < \delta_{i+1}$; and do is 0.

It should be noted that when the time at which the source cell stops providing the service for the terminal device is greater than the first time threshold, it may indicate that the source cell stops providing the service for the terminal device after the first time threshold, or may indicate that the source cell stops providing the service for the terminal device before the first time threshold, which is not limited herein.

In a possible implementation, the parameter threshold may include a second time threshold at which the target cell starts to provide a service for the terminal device. A time at which the target cell starts to provide the service for the terminal device may mean that the target cell provides the service after this time. It may be learned from the foregoing description that the source network device or the terminal device may determine the target cell based on ephemeris information or a satellite orbit. Therefore, the terminal device may further determine a time at which the target cell starts providing the service; and the terminal device is grouped based on this time. In this case, a parameter threshold in grouping information is determined based on a time. The time threshold is the second time threshold at which the target cell starts to provide the service for the terminal device. When a time at which the target cell starts to provide the service for the terminal device is after the second time threshold, the terminal device may initiate measurement and a subsequent handover procedure. A quasi-earth moving cell is used as an example. The service serving time described above may not be used. Instead, the plurality of sets of terminal devices are determined based on a predicted time at which the target cell starts providing the service.

For example, the second time threshold may be used to determine a plurality of sets of terminal devices. For example, the terminal devices for which the target cell starts to provide the service after the second time threshold belong to one set of terminal devices; and the terminal devices for which the target cell starts to provide the service before the second time threshold belongs to another set of terminal devices.

For example, a plurality of time ranges may be determined based on the second time threshold with reference to one or more quantized parameters; and the plurality of time ranges correspond to a plurality of sets of terminal devices. In other words, the time ranges corresponding to the plurality of sets of terminal devices are determined based on the second time threshold and one or more quantized parameters that are based on the second time threshold. The quantized parameter may be determined based on the second time threshold, or may be determined by the source network device. For example, the second time threshold is evenly divided into a plurality of time points, thereby obtaining a plurality of quantized parameters. Two adjacent time points may define one time range. For another example, the source network device may set a plurality of quantized parameters having different values, thereby obtaining a plurality of time points. Two time points whose values are adjacent to each other may define one time range. The terminal devices for which the target cell starts to provide the service within a same time range belong to a same set of terminal devices.

In a specific embodiment, the second time threshold is denoted as $T_{target2}$; and $T_{target2} \pm \delta$ is set to determine a time range. N quantized parameters $\delta_1, \delta_2, \delta_i, \ldots,$ and $\delta_N$ may be obtained by quantizing $\delta$, where i is a natural number ranging from 0 to N−1; and $\delta_1, \delta_2, \delta_i, \ldots,$ and $\delta_N$ are rational numbers. The N quantized parameters may increase sequentially, for example, $\delta_1 < \delta_2 < \delta_3 \ldots < \delta_n$. 2N time points $T_{target2} \pm \delta_1, T_{target2} \pm \delta_2, T_{target2} \pm \delta_i, \ldots,$ and $T_{target2} \pm \delta_N$ may be obtained based on the N quantized parameters. 2N time ranges may be determined based on the second time threshold and the 2N time points. Therefore, based on a quantization dimension of $\delta$, users of a NTN cell may be divided into 2N user handover groups, namely, 2N sets of terminal device. A value of N may be configured flexibly. For example, the value of N may be related to a coverage area. A value of N in a relatively dense coverage area is relatively large.

In an example, the 2N sets of terminal devices may meet the following condition: if a time at which the target cell starts to provide the service for the terminal device is greater than or equal to $T_{target2}$, a time range corresponding to the set of terminal devices to which the terminal device belongs is $(T_{target2} + \delta_i, T_{target2} + \delta_{i+1}]$; or if a time at which the target cell starts to provide the service for the terminal device is less than $T_{target2}$, a time range corresponding to the set of terminal devices to which the terminal device belongs may be $(T_{target2} - \delta_{i+1}, T_{target2} - \delta_i]$, where $\delta_i < \delta_{i+1}$; and $\delta_0$ is 0.

It should be noted that when the time at which the target cell starts to provide the service for the terminal device is greater than the second time threshold, it may indicate that the target cell starts to provide the service for the terminal device after the second time threshold, or may indicate that the target cell starts to provide the service for the terminal device before the second time threshold, which is not limited herein.

In a possible implementation, the parameter threshold may include a quality threshold for a reference signal received by the terminal device. In other words, a parameter threshold in grouping information is determined based on quality of the reference signal. The parameter threshold is the quality threshold for the reference signal received by the terminal device. When the quality of the reference signal measured by the terminal device is less than the quality threshold, the terminal device may initiate a measurement and a subsequent handover procedure.

For example, the quality of the reference signal received by the terminal device may be represented by using a plurality of parameters, for example, RSRP, reference signal received quality (RSRQ), and received signal strength indicator (RSSI).

For example, the quality threshold may be used to determine a plurality of sets of terminal devices. For example, the terminal devices that have received reference signals with qualities less than the quality threshold belong to one set of terminal devices, and the terminal devices that have received reference signals with qualities greater than or equal to the quality threshold belongs to another set of terminal devices.

For example, a plurality of quality ranges may be determined based on the quality threshold with reference to one or more quantized parameters; and the plurality of quality ranges correspond to a plurality of sets of terminal devices. In other words, the quality ranges corresponding to the plurality of sets of terminal devices are determined based on the quality threshold and one or more quantized parameters that are based on the quality threshold. The quantized parameter may be determined based on the quality threshold, or may be determined by the source network device. For example, the quality threshold is evenly divided into a plurality of quality parameters, thereby obtaining a plurality of quantized parameters. Two adjacent quality parameters may define one quality range. For another example, the source network device may set a plurality of quantized parameters having different values, thereby obtaining a plurality of quality parameters. Two quality parameters whose values are adjacent to each other may define one quality range. The terminal devices that have received reference signals with qualities within a same quality range belong to a same set of terminal devices.

In a specific embodiment, the quality threshold is denoted as $Q_{target}$, and a quality parameter range is determined by setting $Q_{target}-\delta$. N quantized parameters $\delta_1, \delta_2, \delta_i, \ldots,$ and $\delta_N$ may be obtained by quantizing $\delta$, where i is a natural number ranging from 0 to N−1; and $\delta_1, \delta_2, \delta_i, \ldots,$ and $\delta_N$ are rational numbers. The N quantized parameters may increase sequentially, for example, $\delta_1<\delta_2<\delta_3 \ldots <\delta_n$. N quality parameters $Q_{target}-\delta_1, Q_{target}-\delta_2, Q_{target}-\delta_i, \ldots,$ and $Q_{target}-\delta_N$ may be obtained based on the N quantized parameters. N quality parameter ranges may be determined based on the quality threshold and the N quality parameters. Therefore, based on a quantization dimension of $\delta$, users of a NTN cell may be divided into N user handover groups, namely, N sets of terminal devices. A value of N may be configured flexibly. For example, the value of N may be related to a coverage area. A value of N in a relatively dense coverage area is relatively large. In an example, the quality parameter range corresponding to the $(i+1)^{th}$ set of terminal devices in the N sets of terminal devices is $(Q_{target}-\delta_{i+1}, Q_{target}-\delta_i]$, where $\delta_i<\delta_{i+1}$; and $\delta_0$ is 0.

In some embodiments, the terminal device may determine, based on a parameter range corresponding to the set of terminal devices to which the terminal device belongs, when to perform handover. Distance threshold-based grouping is used as an example. It may be specified that a handover behavior may only be initiated by a terminal device whose distance range is $(D_{target}+\delta_i, D_{target}+\delta_{i+1}]$. In other words, the terminal device may initiate handover when the terminal device determines that a distance range corresponding to a first set of terminal devices to which the terminal device belongs is $(D_{target}+\delta_i, D_{target}+\delta_{i+1}]$.

Distance threshold-based grouping is still used as an example. If the terminal device finds, via measurement, that the distance between its position and an edge of a cell is within a range corresponding to $D_{target}\pm\delta_2$, the terminal device does not initiate any handover behavior even when a handover command is received. The range corresponding to $D_{target}\pm\delta_2$ may include ranges of $(D_{target}-\delta_2, D_{target}-\delta_1]$, $(D_{target}-\delta_1, D_{target}]$, $(D_{target}, D_{target}+\delta_1]$, and $(D_{target}+\delta_1, D_{target}+\delta_2]$. Based on this setting, the terminal device does not transmit measurement and requests continuously based on a handover command even if the handover command is received too early, thereby reducing overheads of the terminal device and a network. Further, in this case, a period in which the terminal device initiates measurement may be relatively shortened, to determine an occasion at which handover may be performed.

Methods for determining a plurality of sets of terminal devices based on a parameter threshold are described above. It may be learned from the foregoing description that the grouping information may further include a plurality of sub-regions in the source cell, that is, the plurality of sets of terminal devices may alternatively be determined based on the plurality of sub-regions. A manner of determining the plurality of sub-regions is described below with reference to FIG. 7 and FIG. 8.

In a possible implementation, to be better consistent with cellular network coverage of a terrestrial system, or to be consistent with an arrival time at a cell edge and a serving time of the network device, sub-regions in the source cell may be divided based on a coverage angle of the source network device. A NTN system is used as an example. The source cell is divided into the plurality of sub-regions based on a coverage angle of a satellite. Specifically, a coverage angle of a satellite on an edge of a NTN cell is set to a; and the angle is divided into $\alpha_1, \alpha_2, \alpha_3, \ldots, \alpha_i$, where $a_1<\alpha_2<\alpha_3 \ldots <\alpha_i<\alpha$. In other words, the plurality of sub-regions obtained by dividing the NTN may be a plurality of circular or ring-shaped regions centered on a projection position of the network device in a direction perpendicular to the ground. When the NTN cell includes N sub-regions (N is a natural number greater than 1), N coverage angles respectively corresponding to boundaries of the N sub-regions which are further away from the center meet the following condition:

$$0<\alpha_i<\alpha_{i+1}\leq\alpha,$$

where $\alpha_i$ is a coverage angle corresponding to a boundary, which is further away from the center, of the $i^{th}$ sub-region of the N sub-regions; and i is a natural number ranging from 1 to N−1.

For a NTN cell, when the height of the network device from the ground is D, and the distance between the terminal device and the network device (the length of a service link) is $L_i$, the ratio $(D/L_i)$ may be used for determining the coverage angle $\alpha_i$ of the network device corresponding to the terminal device. Specifically, $\alpha_i=\arccos(D/L_i)$.

Figure 7:
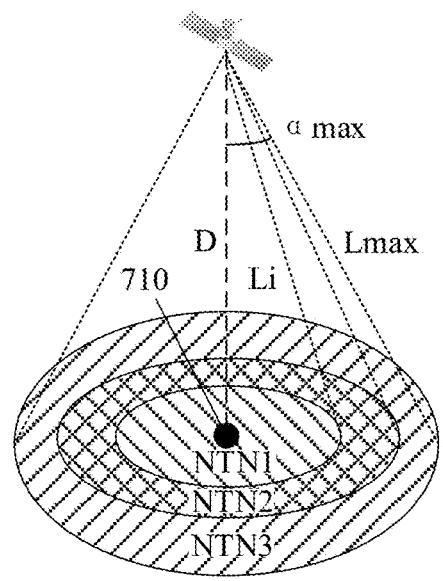
FIG. 7 is a schematic diagram of a possible implementation of sub-region division in the method shown in FIG. 5.

For ease of understanding, a sub-region determined based on a satellite coverage angle is described in detail below with reference to FIG. 7. With reference to FIG. 7, a projection position of a satellite in the NTN cell in a direction perpendicular to the ground is a reference location 710 of the NTN cell. $\alpha_{max}$ in FIG. 7 is the maximum coverage angle of the satellite, which is generally a coverage angle of the satellite at an edge of the cell. $\alpha_{max}$ corresponds to a threshold $L_{max}$ of L. $L_{max}$ is the distance between the edge of the cell and the satellite.

As shown in FIG. 7, the NTN cell is divided into three regions that are three circular regions which are divided based on different coverage angles $\alpha_i$ and centered on the reference location 710. Specifically, the three regions are NTN1, NTN2, and NTN3. Correspondingly, terminal devices in the three regions may be divided into three sets of terminal devices: $UE_{group1}$, $UE_{group2}$, and $UE_{group3}$.

In a possible implementation, the sub-regions in the source cell may be determined based on directions of an SSB beam transmitted by the network device. Different sub-regions are distinguished by using different directions of the SSB beam. The execution of handover for a group of terminal devices may be triggered by using one message, especially in a sub-region on the outermost edge. In this case, an occasion at which the terminal device transmits a random access channel (RACH) to the target cell may be controlled by the network device; and congestion of the RACH may be reduced. For example, the network device may transmit a group handover command based on different sets of terminal devices.

In a possible implementation, the sub-region in the source cell may be determined based on a geographical characteristic of the coverage area of the source cell. In other words, the source cell may be equally or unequally divided into a plurality of sub-regions based on the geographical characteristic of the coverage area of the source cell. The geographical characteristic may be an areal type of a geographic region, or may be a relative location of a geographic region. For example, a city, a desert, and a forest covered by the NTN cell are respectively divided into different sub-regions. For another example, the coverage area of the NTN cell is divided into a plurality of sub-regions based on longitudes and latitudes, which is beneficial to notifying the terminal device of a division manner of the plurality of sub-regions.

Figure 8:
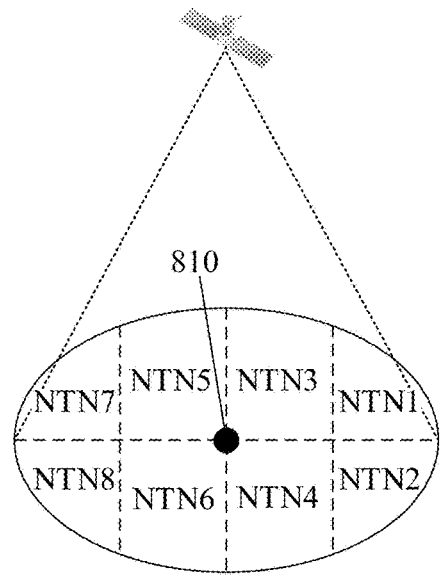
FIG. 8 is a schematic diagram of another possible implementation of sub-region division in the method shown in FIG. 5.

For ease of understanding, a manner of division based on the geographical characteristic of the coverage area of the source cell is described below with reference to FIG. 8. In FIG. 8, the projection position of the satellite in the direction perpendicular to the ground is the reference location 810 of the NTN cell. As shown in FIG. 8, the NTN cell is divided into eight regions: NTN1, NTN2, NTN3, . . . , and NTN8. The terminal devices in the eight regions are correspondingly divided into eight sets of terminal device: $UE_{group1}$, $UE_{group2}$, $UE_{group3}$, . . . , and $UE_{group8}$. In FIG. 8, the dashed lines for dividing the eight sub-regions may be determined based on longitudes and latitudes, or may be determined via equal division based on a diameter of a coverage cell. According to such division manner, the NTN cell may alternatively be divided into four sub-regions, six sub-regions, or the like. Details are not described herein again.

The foregoing further describes that a PCI conflict may occur when the terminal device executes a PCI-based handover. For ease of understanding, a PCI conflict scenario is described below with reference to FIG. 9 by using a quasi-earth fixed cell as an example. In a quasi-earth fixed cell scenario, it may be generally considered that a base station may serve a same region even if a satellite connected to the base station is changed. In other words, when a target satellite and a next satellite serve a same region, a terminal device may assume that a cell remains unchanged, so that a handover command may be reduced. In addition, the terminal device may still use a configuration from a previous cell. Therefore, because a source network device does not need to transmit a handover command to all served terminal devices during a satellite handover, signalling overheads may be significantly reduced. However, if PCIs corresponding to a source satellite and a target satellite that serve a same region are the same, a conflict may occur. For example, at a time instant T0, regions respectively covered by the two satellites are a region A and a region B, and a region in which the region A and the region B overlaps with each other is a region C. If a terminal device in the region C receives signals from the two satellites at the same time, a PCI conflict may occur.

Figure 9:
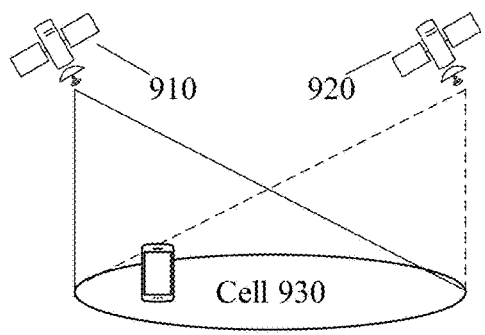
FIG. 9 is a schematic diagram of a PCI conflict in a quasi-earth fixed cell.

Refer to FIG. 9. Both the satellite 910 and the satellite 920 provide services for the cell 930 simultaneously. It may be learned from the foregoing description that a soft handover means that a terminal device connects to two satellites at the same time, and that a hard handover means that a terminal device connects to only one satellite at a time. Therefore, FIG. 9 is a soft handover process, and a PCI conflict may occur in case of the soft handover.

In one case, a source satellite of a terminal device serves a region A; there is an overlapped region C between a region B served by a target satellite and the region A; and the terminal device is in the region C. If both base stations corresponding to the source satellite and the target satellite are deployed on these satellites, that is, PCIs of the base stations are different, the terminal device may perform soft handover as specified in the R17 standard.

In another case, if base stations are deployed on the ground, PCIs corresponding to a source satellite and a target satellite may be the same, and thus a collision may occur.

It should be noted that, in a quasi-earth fixed cell, with a same SSB for a same cell, a PCI remains unchanged during a hard satellite handover. In other words, in a hard handover scenario of the fixed cell, because a terminal device does not receive signals from the two satellites at the same time, the PCI remains unchanged, and there is no interference or conflict. Specifically, in a handover process, the source satellite may transmit an indication to the terminal device, to instruct the terminal device to perform downlink synchronization with the target satellite. The indication may be included in system information or dedicated signalling. After receiving the indication, the terminal device starts to perform downlink synchronization before a time at which the source satellite stops providing a service. For example, when a service serving time expires, a satellite corresponding to the terminal device needs to be handed over from the source satellite to the target satellite.

It may be learned from the foregoing description that cells in a NTN system include quasi-earth fixed cells and quasi-earth moving cells. For a quasi-earth moving cell and a quasi-earth fixed cell, grouping standards of a terminal device during handover grouping in the foregoing description may be different. Therefore, the terminal device needs to know a type of a current serving cell. In other words, because the terminal device needs to predict a track of an earth moving cell, the terminal device needs to know a type of an accessed cell.

In some embodiments, when the terminal device accesses a NTN cell, a network device may transmit the type of a current cell to the terminal device in a plurality of manners. In other words, before the terminal device receives grouping information transmitted by a source network device, the terminal device may receive a cell type corresponding to a source cell that is transmitted by the source network device. The cell type may be quasi-earth fixed cell or quasi-earth moving cell, or may be another distinguishing type related to cell handover performed by the terminal device.

In a possible implementation, the cell type may be transmitted by using one or both of the following: a system message and/or a broadcast message transmitted by the source network device; or a message 2 (msg2) transmitted by the source network device.

For example, the source network device may notify the terminal device by using the system message or the broadcast message. For example, the source network device may carry cell type information by using an SIB, or may indicate a cell type by means of a value of downlink control information (DCI) in a search space. For the terminal device, after performing a cell search process and decoding a primary synchronization signal (PSS) and a secondary synchronization signal (SSS), the terminal device may obtain a physical cell ID. Further, after successfully decoding a master information block (MIB), the terminal device may obtain a control set required for SIB decoding and information related to a PDCCH search space. Therefore, the terminal device may determine a cell type of a current cell by using a SIB or DCI.

For example, the source network device may notify the terminal device of the cell type by using the message 2. For the terminal device, in a random access procedure, the cell type of the current cell may be determined by using the message 2. For example, the source network device may indicate the cell type by using a channel state information (CSI) request bit in the message 2. In the message 2, a CSI request bit in a random access response (RAR) uplink grant is a reserved bit and may be used to indicate a cell type. For example, CSI request bit=1 indicates that the cell is a quasi-earth moving cell; and CSI request bit=0, namely, a reserved value, indicates that the cell is a quasi-earth fixed cell.

Several cell handover methods provided in embodiments of the present application are described above with reference to FIG. 5 to FIG. 9. To better understand the present application, an embodiment of the present application is described in more detail with reference to FIG. 10. It should be understood that the method shown in FIG. 10 is merely an example, and is not a limitation on this embodiment of the present invention.

Figure 10:
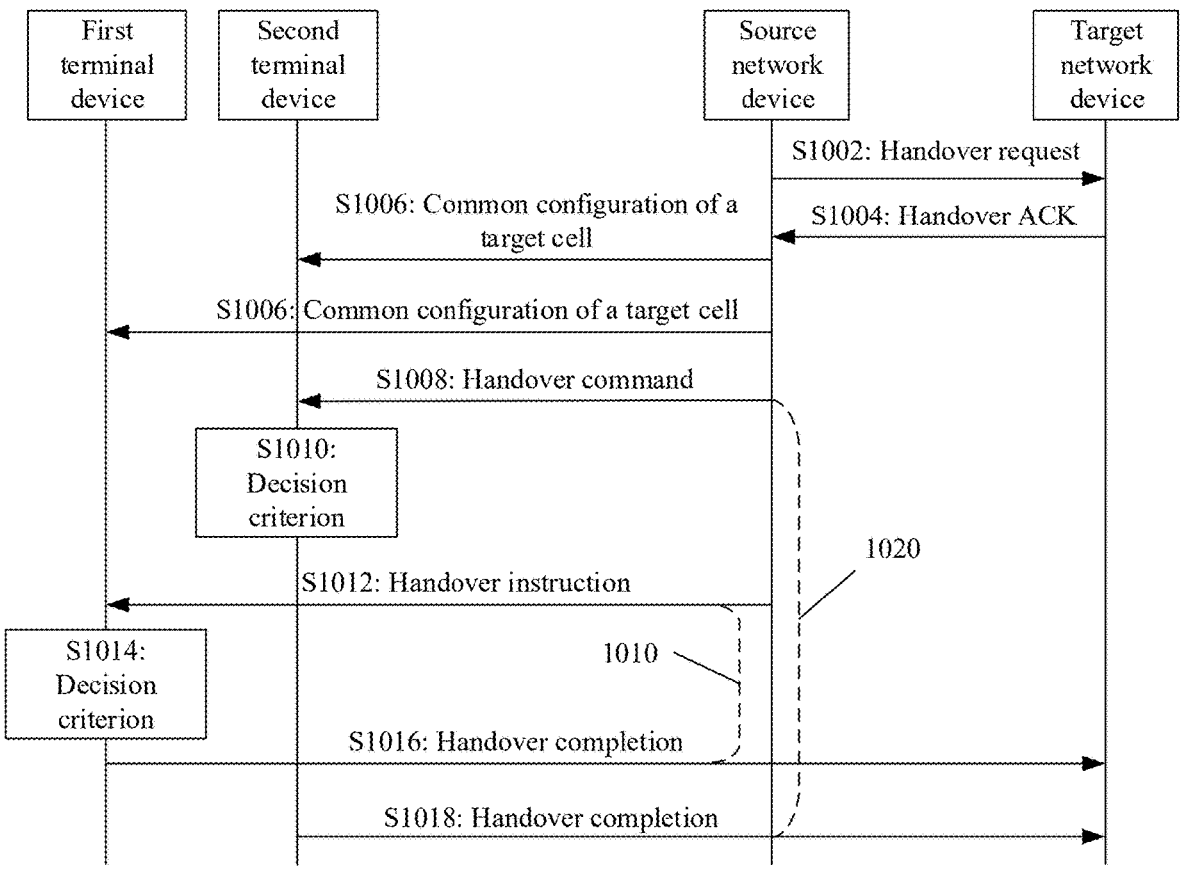
FIG. 10 is a schematic flowchart of a possible implementation according to an embodiment of the present application.

FIG. 10 is described from the perspective of interaction among a first terminal device, a second terminal device, a source network device, and a target network device. The first terminal device and the second terminal device may be two terminal devices in a same set of terminal devices, or may be two terminal devices that belong to different sets of terminal devices, respectively. The sets of terminal devices may be determined based on the foregoing parameter threshold, or may be determined based on a sub-region.

Refer to FIG. 10. In Step S1002, the source network device transmits a handover request to the target network device.

In Step S1004, the target network device transmits a handover response to the source network device. The handover response may be a handover acknowledge (ACK) shown in FIG. 10, or may be RRC information.

In Step S1006, the source network device transmits a common configuration of a target cell to the first terminal device and the second terminal device by using an SIB or multicast. The common configuration corresponds to the first information described above.

In Step S1008, the source network device transmits a handover command to the second terminal device by using an RRC message.

In Step S1010, the second terminal device performs first determination based on a decision criterion, and determines, based on a result of the determination, whether to perform cell handover immediately.

In Step S1012, the source network device transmits a handover command to the first terminal device by using an RRC message.

In Step S1014, the first terminal device performs first determination based on a decision criterion, and determines, based on a result of the determination, whether to perform cell handover immediately.

In Step S1016, the first terminal device transmits a handover completion to the target network device. A short dashed line between Step S1012 and Step S1016 in FIG. 10 denotes a wait time 1010 for which the first terminal device executes a handover wait mechanism. If the handover command includes handover wait indication information corresponding to the first terminal device, the first terminal device may execute the handover wait mechanism based on the handover wait indication information.

In Step S1018, the second terminal device transmits a handover completion to the target network device. A long dashed line between Step S1008 and Step S1018 in FIG. 10 denotes a wait time 1020 for which the second terminal device executes a handover wait mechanism. If the handover command includes handover wait indication information corresponding to the second terminal device, the second terminal device may execute the handover wait mechanism based on the handover wait indication information.

The cell handover method provided in embodiments of the present application and a plurality of embodiments are described above. It should be noted that the method in embodiments of the present application also supports time- and distance-based conditional handover (CHO). The time- and distance-based CHO may improve a handover procedure of a terminal device. As specified in R17, CHO is time-based. In R18, because "quasi-earth moving cell" is introduced, distance-based CHO may also be implemented. If the source network device knows a time range, a distance range, and an RSRP-based event as required by the terminal device for handover, an appropriate trigger condition may be set for execution of the handover. For example, the source network device may set an A4 event for triggering the handover.

In some embodiments, because an orbit of a satellite is planned in advance, in a moving cell scenario, a cell to be covered in a fixed geographic region on the ground may be known in advance. From the perspective of a terminal device, if the terminal device stays in a region for a long time, a target cell to be handed over to later may be known in advance. If a network supports CHO, one CHO command may be used subsequent handovers for N times, so that costs of N−1 handover commands are saved.

In some embodiments, a plurality of candidate cells are configured, and a CHO/handover configuration is not deleted after execution of CHO and/or this handover method, so that it is ensured that the CHO configuration/handover is still valid for a next cell.

In an implementation, it is necessary for the source network device to correctly estimate a distance window or time window for CHO execution of each terminal device. To accurately estimate the distance or time window, the estimating may be performed with reference to a distance between the terminal device and an edge of a cell or with reference to a serving time and an RSRP event. For example, a cell radio network temporary identifier (C-RNTI) may be configured individually on a per-group basis just like a CHO execution condition, and group-based handover is triggered by a PDCCH addressed by a C-RNTI of the group.

The method embodiments of the present application are described in detail above with reference to FIG. 1 to FIG. 10. The apparatus embodiments of the present application are described in detail below with reference to FIG. 11 to FIG. 13. It should be understood that the description of the apparatus embodiments corresponds to the description of the method embodiments, and therefore, for parts that are not described in detail, reference may be made to the foregoing method embodiments.

Figure 11:
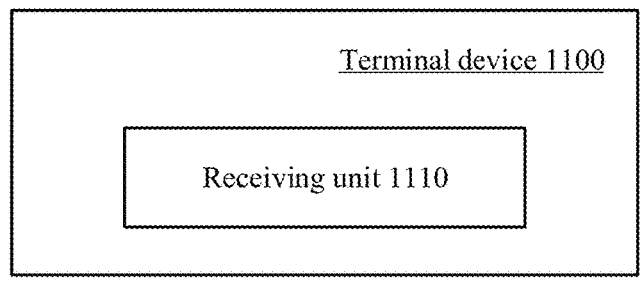
FIG. 11 is a schematic structural diagram of a terminal device according to an embodiment of the present application.

FIG. 11 is a schematic block diagram of a terminal device according to an embodiment of the present application. The terminal device 1100 may be any one of the terminal devices described above. The terminal device 1100 shown in FIG. 11 includes a receiving unit 1110.

The receiving unit 1110 may be configured to receive first information transmitted by a source network device to a first set of terminal devices, where the first information is used to assist at least some of terminal devices in the first set of terminal devices in handover from a source cell corresponding to the source network device to a target cell corresponding to a target network device; the first set of terminal devices is one of a plurality of sets of terminal devices in the source cell; and the plurality of sets of terminal devices are determined based on grouping information.

Optionally, the grouping information includes one or more of the following: a parameter threshold used for determining the plurality of sets of terminal devices; a plurality of sub-regions in the source cell; or group identifiers corresponding to the plurality of sets of terminal devices.

Optionally, the grouping information includes the parameter threshold used for determining the plurality of sets of terminal devices; and the parameter threshold is related to one or more of the following: a distance between the terminal device and an edge of the source cell; a time at which the source cell stops providing a service for the terminal device; a time at which the target cell starts to provide a service for the terminal device; or quality of a reference signal received by the terminal device.

Optionally, the parameter threshold includes a distance threshold for the distance between the terminal device and an edge of the source cell; and distance ranges corresponding to the plurality of sets of terminal devices are determined based on the distance threshold and one or more quantized parameters that are based on the distance threshold.

Optionally, the parameter threshold includes a first time threshold at which the source cell stops providing a service for the terminal device; and time ranges corresponding to the plurality of sets of terminal devices are determined based on the first time threshold and one or more quantized parameters that are based on the first time threshold.

Optionally, the source cell is a quasi-earth fixed cell or a quasi-earth moving cell; and the first time threshold is a service serving time corresponding to the source cell.

Optionally, the parameter threshold includes a quality threshold for a reference signal received by the terminal device; and quality parameter ranges corresponding to the plurality of sets of terminal devices are determined based on the quality threshold and one or more quantized parameters that are based on the quality threshold.

Optionally, quality of the reference signal received by the terminal device is one or more of the following: RSRP, RSRQ, or an RSSI.

Optionally, the grouping information includes the parameter threshold used for determining the plurality of sets of terminal devices; the grouping information is further used to trigger the terminal device to determine a first parameter corresponding to the parameter threshold; and the first parameter is used by the terminal device to determine the first set of terminal devices.

Optionally, the terminal device 1100 further includes a measurement unit that may be configured to perform measurement based on the grouping information to obtain the first parameter.

Optionally, the grouping information includes the plurality of sub-regions in the source cell; and the sub-regions are determined based on one or more of the following: a coverage angle of the source network device; a direction of an SSB beam transmitted by the network device; or a geographical characteristic of a coverage area of the source cell.

Optionally, the receiving unit is further configured to receive a handover command transmitted by the source network device; and the terminal device 1100 further includes a determining unit that may be configured to determine, based on first auxiliary information, whether to perform cell handover immediately, where the first auxiliary information includes one or more of the following: a handover relaxation amount corresponding to the terminal device; a set of terminal devices to which the terminal device belongs; information about a service of the terminal device upon receiving the handover command; first determination performed by the terminal device; or handover wait indication information transmitted by the source network device.

Optionally, the first auxiliary information includes the information about the service of the terminal device upon receiving the handover command; the information about the service indicates that a time at which the terminal device completes the service is earlier than or equal to a third time threshold; and the terminal device 1100 further includes a first execution unit that may be configured to perform cell handover after the service is completed.

Optionally, the first auxiliary information includes the handover relaxation amount corresponding to the terminal device; and the handover relaxation amount is determined based on one or both of the following: a set of terminal devices to which the terminal device belongs; or a QoS requirement for a service corresponding to the terminal device.

Optionally, the handover relaxation amount is determined based on the set of terminal devices to which the terminal device belongs; and handover relaxation amounts corresponding to all the terminal devices in the first set of terminal devices are the same.

Optionally, the first auxiliary information includes the handover wait indication information transmitted by the source network device; and the terminal device 1100 further includes a second execution unit that is configured to execute a handover wait mechanism before a handover completion is transmitted to the target network device.

Optionally, a wait time corresponding to the handover wait mechanism is determined based on one or more of the following: a service type of the terminal device; the set of terminal devices to which the terminal device belongs; the handover relaxation amount corresponding to the terminal device; or a candidate cell corresponding to the terminal device.

Optionally, the handover command indicates that a PCI of the target cell conflicts with a PCI of the source cell; and the determining unit is further used to determine the target cell based on an SSB beam.

Optionally, the first information includes a common configuration of the target cell; and the common configuration is carried in broadcast information or multicast information.

Optionally, the first information is further used to indicate second auxiliary information of the target cell and/or a neighboring cell corresponding to the source network; and the second auxiliary information includes one or more of the following: ephemeris information of a satellite corresponding to the target cell and/or the neighboring cell; a validity period of the target cell and/or the neighboring cell; a TA corresponding to the target cell and/or the neighboring cell; an ID of a satellite corresponding to the target cell and/or the neighboring cell; a frequency and/or a cell list of the target cell and/or the neighboring cell; location information of the target cell and/or the neighboring cell; a serving time of the target cell and/or the neighboring cell; or a cell type corresponding to the target cell and/or the neighboring cell.

Optionally, the second auxiliary information includes the validity period of the target cell and/or the neighboring cell; and the terminal device 1100 further includes a setting unit for setting corresponding timers for the target cell and each neighboring cell of the source cell.

Optionally, the second auxiliary information is transmitted by means of one or more SIBs; and the one or more SIBs are existing SIBs or new SIBs.

Optionally, the receiving unit is further configured to receive a cell type corresponding to the source cell that is transmitted by the source network device.

Optionally, the cell type is transmitted by using one or both of the following: a system message and/or a broadcast message transmitted by the source network device; or a message 2 transmitted by the source network device in a random access procedure corresponding to the terminal device.

Optionally, the terminal device 1100 further includes a transmitting unit that may be configured to transmit capability information of the terminal device to the source network device, where the capability information is used to indicate that the terminal device supports cell handover based on a set of terminal devices.

Figure 12:
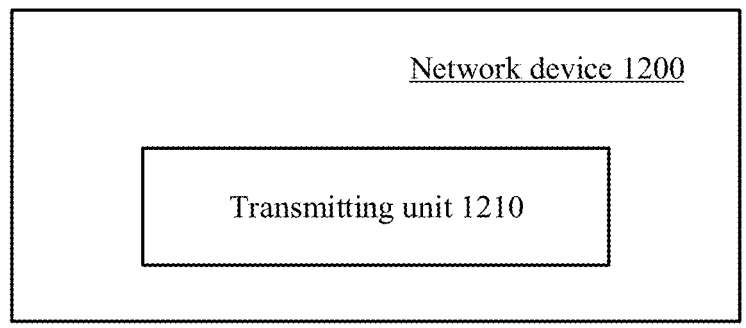
FIG. 12 is a schematic structural diagram of a network device according to an embodiment of the present application.

FIG. 12 is a schematic block diagram of a network device according to an embodiment of the present application. The network device 1200 may be any one of the source network devices described above. The network device 1200 shown in FIG. 12 includes a transmitting unit 1210.

The transmitting unit 1210 may be configured to transmit first information to a terminal device in a first set of terminal devices, where the first information is used to assist at least some of terminal devices in the first set of terminal devices in handover from a source cell corresponding to the source network device to a target cell corresponding to a target network device; the first set of terminal devices is one of a plurality of sets of terminal devices in the source cell; and the plurality of sets of terminal devices are determined based on grouping information.

Optionally, the grouping information includes one or more of the following: a parameter threshold used for determining the plurality of sets of terminal devices; a plurality of sub-regions in the source cell; or group identifiers corresponding to the plurality of sets of terminal devices.

Optionally, the grouping information includes the parameter threshold used for determining the plurality of sets of terminal devices; and the parameter threshold is related to one or more of the following: a distance between the terminal device and an edge of the source cell; a time at which the source cell stops providing a service for the terminal device; a time at which the target cell starts to provide a service for the terminal device; or quality of a reference signal received by the terminal device.

Optionally, the parameter threshold includes a distance threshold between the terminal device and an edge of the source cell; and distance ranges corresponding to the plurality of sets of terminal devices are determined based on the distance threshold and one or more quantized parameters that are based on the distance threshold.

Optionally, the plurality of sets of terminal devices are 2N sets of terminal devices; the distance threshold is denoted as $D_{target}$; and the 2N sets of terminal devices meet the following conditions: if a distance between the terminal device and the edge of the source cell is greater than or equal to $D_{target}$, a distance range corresponding to a set of terminal devices to which the terminal device belongs is ($D_{target}+\delta_i$, $D_{target}+\delta_{i+1}$]; or if a distance between the terminal device and the edge of the source cell is less than $D_{target}$, a distance range corresponding to a set of terminal devices to which the terminal device belongs is ($D_{target}-\delta_{i+1}$, $D_{target}-\delta_i$], where $\delta_i$ denotes a quantized parameter; i is a natural number ranging from 0 to N−1; $\delta_i<\delta_{i+1}$; and $\delta_0$ is 0.

Optionally, the parameter threshold includes a first time threshold at which the source cell stops providing a service for the terminal device; and time ranges corresponding to the plurality of sets of terminal devices are determined based on the first time threshold and one or more quantized parameters that are based on the first time threshold.

Optionally, the plurality of sets of terminal devices are 2N sets of terminal devices; the first time threshold is denoted as $T_{target1}$; and the 2N sets of terminal devices meet the following conditions: if a time at which the source cell stops providing the service for the terminal device is greater than or equal to $T_{target1}$, a time range corresponding to a set of terminal devices to which the terminal device belongs is ($T_{target1}+\delta_i$, $T_{target1}+\delta_{i+1}$]; or if a time at which the source cell stops providing the service for the terminal device is less than $T_{target1}$, a time range corresponding to a set of terminal devices to which the terminal device belongs is ($T_{target1}-\delta_{i+1}$, $T_{target1}-\delta_i$], where $\delta_i$ denotes a quantized parameter; i is a natural number ranging from 0 to N−1; $\delta_i<\delta_{i+1}$; and $\delta_0$ is 0.

Optionally, the source cell is a quasi-earth fixed cell or a quasi-earth moving cell; and the first time threshold is a service serving time corresponding to the source cell.

Optionally, the parameter threshold includes a quality threshold for a reference signal received by the terminal device; and quality parameter ranges corresponding to the plurality of sets of terminal devices are determined based on the quality threshold and one or more quantized parameters that are based on the quality threshold.

Optionally, the plurality of sets of terminal devices are N sets of terminal devices; the quality threshold is denoted as $Q_{target}$; the quality parameter range corresponding to the $(i+1)^{th}$ set of terminal devices in the N sets of terminal devices is ($Q_{target}-\delta_{i+1}$, $Q_{target}-\delta_i$]; $\delta_i$ denotes a quantized parameter; i is a natural number ranging from 0 to N−1; $\delta_i<\delta_{i+1}$; and $\delta_0$ is 0.

Optionally, quality of the reference signal received by the terminal device is one or more of the following: RSRP, RSRQ, or an RSSI.

Optionally, the grouping information includes the parameter threshold used for determining the plurality of sets of terminal devices; the grouping information is further used to trigger the terminal device to determine a first parameter corresponding to the parameter threshold; and the first parameter is used by the terminal device to determine the first set of terminal devices.

Optionally, the grouping information includes the plurality of sub-regions in the source cell; and the sub-regions are determined based on one or more of the following: a coverage angle of the source network device; a direction of an SSB beam transmitted by the network device; or a geographical characteristic of a coverage area of the source cell.

Optionally, the transmitting unit is further configured to transmit a handover command to the terminal device, where the handover command is used to instruct the terminal device to determine, based on first auxiliary information, whether to perform cell handover immediately; and the first auxiliary information includes one or more of the following: a handover relaxation amount corresponding to the terminal device; a set of terminal devices to which the terminal device belongs; information about a service of the terminal device upon receiving the handover command; first determination as performed by the terminal device; or handover wait indication information transmitted by the source network device.

Optionally, the first auxiliary information includes the handover relaxation amount corresponding to the terminal device; and the handover relaxation amount is determined based on one or both of the following: the set of terminal devices to which the terminal device belongs; or a QoS requirement for a service corresponding to the terminal device.

Optionally, the handover relaxation amount is determined based on the set of terminal devices to which the terminal device belongs; and handover relaxation amounts corresponding to all the terminal devices in the first set of terminal devices are the same.

Optionally, the first auxiliary information includes the handover wait indication information transmitted by the source network device; and the handover wait indication information is further used to instruct the terminal device to execute a handover wait mechanism before transmitting a handover completion to the target network device.

Optionally, a wait time corresponding to the handover wait mechanism is determined based on one or more of the following: a service type of the terminal device; the set of terminal devices to which the terminal device belongs; the handover relaxation amount corresponding to the terminal device; or a candidate cell corresponding to the terminal device.

Optionally, the first information includes a common configuration of the target cell; and the common configuration is carried in broadcast information or multicast information.

Optionally, the first information is further used to indicate second auxiliary information of the target cell and/or a neighboring cell corresponding to the source network; and the second auxiliary information includes one or more of the following: ephemeris information of a satellite corresponding to the target cell and/or the neighboring cell; a validity period of the target cell and/or the neighboring cell; a TA corresponding to the target cell and/or the neighboring cell; an ID of a satellite corresponding to the target cell and/or the neighboring cell; a frequency and/or a cell list of the target cell and/or the neighboring cell; location information of the target cell and/or the neighboring cell; a serving time of the target cell and/or the neighboring cell; or a cell type corresponding to the target cell and/or the neighboring cell.

Optionally, the second auxiliary information is transmitted by means of one or more SIBs; and the one or more SIBs are existing SIBs or new SIBs.

Optionally, the transmitting unit is further configured to transmit, to the terminal device, a cell type corresponding to the source cell.

Optionally, the cell type is transmitted by means of one or both of the following: a system message and/or a broadcast message transmitted by the source network device; or a message 2 transmitted by the source network device in a random access procedure corresponding to the terminal device.

Optionally, the network device 1200 further includes a receiving unit that may be configured to receive capability information of the terminal device transmitted by the terminal device, where the capability information is used to indicate that the terminal device supports cell handover based on a set of terminal devices.

Figure 13:
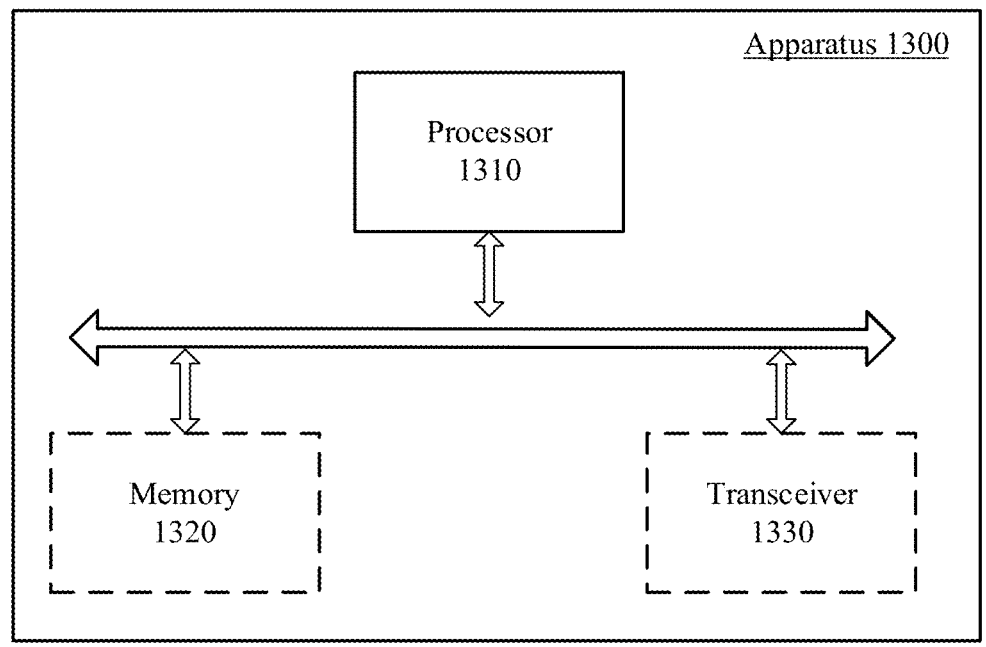
FIG. 13 is a schematic structural diagram of a communications apparatus according to an embodiment of the present application.

FIG. 13 is a schematic structural diagram of a communications apparatus according to an embodiment of the present application. The dashed lines in FIG. 13 indicate that the units or modules are optional. The apparatus 1300 may be configured to implement the methods described in the foregoing method embodiments. The apparatus 1300 may be a chip, a terminal device, or a network device.

The apparatus 1300 may include one or more processors 1310. The processor 1310 may allow the apparatus 1300 to implement the methods described in the foregoing method embodiments. The processor 1310 may be a general-purpose processor or a dedicated processor. For example, the processor may be a central processing unit (CPU). Alternatively, the processor may be another general-purpose processor, a digital signal processor (DSP), an application specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

The apparatus 1300 may further include one or more memories 1320. The memory 1320 stores a program thereon. The program may be executed by the processor 1310 to cause the processor 1310 to execute the methods described in the foregoing method embodiments. The memory 1320 may be independent of the processor 1310 or may be integrated into the processor 1310.

The apparatus 1300 may further include a transceiver 1330. The processor 1310 may communicate with another device or chip through the transceiver 1330. For example, the processor 1310 may transmit data to and receive data from another device or chip through the transceiver 1330.

An embodiment of the present application further provides a computer-readable storage medium for storing a program. The computer-readable storage medium may be applied to the terminal device or the network device provided in embodiments of the present application, and the program causes a computer to execute the methods to be executed by the terminal device or the network device in various embodiments of the present application.

The computer-readable storage medium may be any usable medium readable by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid state disk (SSD)), or the like.

An embodiment of the present application further provides a computer program product. The computer program product includes a program. The computer program product may be applied to the terminal device or the network device provided in embodiments of the present application, and the program causes a computer to execute the methods to be executed by the terminal or network device in various embodiments of the present application.

All or some of the foregoing embodiments may be implemented by using software, hardware, firmware, or any combination thereof. When software is used to implement embodiments, the foregoing embodiments may be implemented completely or partially in a form of a computer program product. The computer program product includes one or more computer instructions. When the computer program instructions are loaded and executed on a computer, the procedures or functions according to embodiments of the present application are completely or partially generated. The computer may be a general-purpose computer, a dedicated computer, a computer network, or another programmable apparatus. The computer instructions may be stored in a computer-readable storage medium or transmitted from a computer-readable storage medium to another computer-readable storage medium. For example, the computer instructions may be transmitted from a website, computer, server, or data center to another website, computer, server, or data center in a wired (for example, a coaxial cable, an optical fiber, and a digital subscriber line (DSL)) manner or a wireless (for example, infrared, radio, and microwave) manner.

An embodiment of the present application further provides a computer program. The computer program may be applied to the terminal device or the network device provided in embodiments of the present application, and the computer program causes a computer to perform the methods performed by the terminal or network device in various embodiments of the present application.

The terms "system" and "network" in the present application may be used interchangeably. In addition, the terms used in the present application are only used to explain the specific embodiments of the present application, and are not intended to limit the present application. The terms "first", "second", "third", "fourth", and the like in the specification, claims, and drawings of the present application are used to distinguish between different objects, rather than to describe a specific order. In addition, the terms "include" and "have" and any variations thereof are intended to cover a non-exclusive inclusion.

In embodiments of the present application, "indicate" mentioned herein may refer to a direct indication, or may refer to an indirect indication, or may mean that there is an association relationship. For example, A indicates B, which may mean that A directly indicates B, for example, B may be obtained by means of A; or may mean that A indirectly indicates B, for example, A indicates C, and B may be obtained by means of C; or may mean that there is an association relationship between A and B.

In embodiments of the present application, the term "corresponding" may mean that there is a direct or indirect correspondence between the two, or may mean that there is an association relationship between the two, which may also be a relationship such as indicating and being indicated, or configuring and being configured.

In embodiments of the present application, "pre-defined" or "pre-configured" may be implemented by pre-storing corresponding codes, tables, or other forms that can be used to indicate related information in devices (for example, including the terminal device and the network device), and a specific implementation thereof is not limited in the present application. For example, being pre-defined may refer to being defined in a protocol.

In embodiments of the present application, the "protocol" may refer to a standard protocol in the communications field, and may include, for example, an LTE protocol, an NR protocol, and a related protocol applied to a future communications system, which is not limited in the present application.

In embodiments of the present application, determining B based on A does not mean determining B based only on A, but instead B may be determined based on A and/or other information.

In embodiments of the present application, the term "and/or" is merely an association relationship that describes associated objects, and represents that there may be three relationships. For example, A and/or B may represent three cases: only A exists, both A and B exist, and only B exists. In addition, the character "/" in this specification generally indicates an "or" relationship between the associated objects.

In embodiments of the present application, sequence numbers of the foregoing processes do not mean execution sequences. The execution sequences of the processes should be determined according to functions and internal logic of the processes, and should not be construed as any limitation on the implementation processes of embodiments of the present application.

In several embodiments provided in the present application, it should be understood that, the disclosed system, apparatus, and method may be implemented in other manners. For example, the described apparatus embodiments are merely examples. For example, unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

Units described as separate components may be or may not be physically separate, and components displayed as units may be or may not be physical units, that is, may be located in one position or distributed on a plurality of network units. Some or all of the units may be selected according to actual needs to achieve the objectives of solutions of embodiments.

In addition, functional units in various embodiments of the present application may be integrated into one processing unit, or each of the units may exist alone physically, or two or more units may be integrated into one unit.

The foregoing descriptions are merely specific implementations of the present application, but the protection scope of the present application is not limited thereto. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A cell handover method, comprising:
receiving, by a terminal device in a non-terrestrial (NTN) network, first information, wherein the first information comprises second auxiliary information of at least one of a target cell corresponding to a source cell or a neighboring cell corresponding to the source cell, wherein a physical cell identity (PCI) of a target cell is the same as a PCI of the source cell;
performing downlink synchronization with the target cell; and
accessing the target cell.

2. A terminal device, comprising:
at least one processor; and
one or more non-transitory computer-readable storage media coupled to the at least one processor and storing programming instructions for execution by the at least one processor, wherein the programming instructions, when executed, cause the terminal device to perform operations comprising:
receiving, first information in a non-terrestrial (NTN) network, wherein the first information comprises second auxiliary information of at least one of a target cell corresponding to a source cell or a neighboring cell corresponding to the source cell, wherein a physical cell identity (PCI) of a target cell is the same as a PCI of the source cell;
performing downlink synchronization with the target cell; and
accessing the target cell.

3. The terminal device according to claim 2, wherein the operations comprise:
receiving a handover command from a source network device corresponding to the source cell;
determining, based on first auxiliary information, whether to perform a cell handover from the source cell to the target cell, wherein the first auxiliary information comprises one or more of following:
a handover relaxation amount corresponding to the terminal device;
information about a service of the terminal device upon receiving the handover command;
first determination performed by the terminal device; or
handover wait indication information received from the source network device.

4. The terminal device according to claim 3, wherein the first auxiliary information comprises the information about the service of the terminal device upon receiving the handover command, the information about the service indicates that a time at which the terminal device completes the service is earlier than or equal to a third time threshold, and the operations comprise performing the cell handover after the service is completed.

5. The terminal device according to claim 3, wherein the first auxiliary information comprises the handover relaxation amount corresponding to the terminal device, and the handover relaxation amount is determined based on a quality of service (QOS) requirement for a service corresponding to the terminal device.

6. The terminal device according to claim 3, wherein the first auxiliary information comprises the handover wait indication information received from the source network device, and the operations comprise:
executing a handover wait mechanism before a handover completion indication is transmitted to a target network device corresponding to the target cell.

7. The terminal device according to claim 6, wherein a wait time corresponding to the handover wait mechanism is determined based on one or more of following:
a service type of the terminal device;
a handover relaxation amount corresponding to the terminal device; or
a candidate cell corresponding to the terminal device.

8. The terminal device according to claim 3, wherein the handover command indicates that the PCI of the target cell is the same as the PCI of the source cell, and the operations comprise determining the target cell based on a synchronization signal block (SSB) beam.

9. The terminal device according to claim 2, wherein the first information instructs the terminal device to perform downlink synchronization with the target cell.

10. The terminal device according to claim 3, wherein the cell handover comprises a conditional handover (CHO) that is based on at least one of distance or time, a handover command corresponding to the CHO is used for the terminal device to perform at least one cell handover.

11. The terminal device according to claim 2, wherein the first information comprises a common configuration of the target cell, and the common configuration is carried in broadcast information or multicast information.

12. The terminal device according to claim 2, wherein the second auxiliary information comprises one or more of following:
ephemeris information of a satellite corresponding to at least one of the target cell or the neighboring cell,
a validity period of at least one of the target cell or the neighboring cell,
a timing advance (TA) corresponding to at least one of the target cell or the neighboring cell,
an identifier (ID) of a satellite corresponding to at least one of the target cell or the neighboring cell,
a frequency and/or a cell list of at least one of the target cell or the neighboring cell,
location information of at least one of the target cell or the neighboring cell,
a serving time of the at least one of the target cell or the neighboring cell, or
a cell type corresponding to at least one of the target cell or the neighboring cell.

13. The terminal device according to claim 12, wherein the second auxiliary information comprises the validity period of at least one of the target cell or the neighboring cell, and the operations comprise:
setting corresponding timers for the target cell and each neighboring cell of the source cell.

14. The terminal device according to claim 12, wherein the second auxiliary information is carried in one or more system information blocks (SIB).

15. The terminal device according to claim 2, wherein the operations comprise receiving a cell type corresponding to the source cell.

16. The terminal device according to claim 15, wherein the cell type is carried in at least one of following:
a system message or a broadcast message from a source network device corresponding to the source cell, or
a msg2 from the source network device in a random access procedure corresponding to the terminal device.

17. A network device, comprising:
at least one processor; and
one or more non-transitory computer-readable storage media coupled to the at least one processor and storing programming instructions for execution by the at least one processor, wherein the programming instructions, when executed, cause the network device to perform operations comprising:

transmitting first information to a terminal device in a non-terrestrial (NTN) network, wherein the first information comprises second auxiliary information of at least one of a target cell corresponding to a source cell or a neighboring cell corresponding to the source cell, wherein a physical cell identity (PCI) of a target cell is the same as a PCI of the source cell, wherein the source cell corresponds to the network device.

18. The network device according to claim 17, wherein the first information instructs the terminal device to perform downlink synchronization with the target cell in a cell handover from the source cell to the target cell.

19. The network device according to claim 18, wherein the cell handover comprises a conditional handover (CHO) that is based on at least one of distance or time, and wherein the operations comprise sending a handover command to the terminal device.

20. The network device according to claim 17, wherein the second auxiliary information in carried in one or more system information blocks (SIB).

* * * * *